United States Patent
Otsuka

[11] Patent Number: 6,094,723
[45] Date of Patent: *Jul. 25, 2000

[54] COPY PROTECTION SYSTEM FOR RECORDING MEDIA

[75] Inventor: Satoshi Otsuka, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/846,773

[22] Filed: Apr. 30, 1997

[30] Foreign Application Priority Data

May 10, 1996 [JP] Japan ................................. 8-139778
Mar. 31, 1997 [JP] Japan ................................. 9-080127

[51] Int. Cl.[7] ................................. G06F 11/30; G06F 12/14
[52] U.S. Cl. ........................ 713/200; 360/60; 369/44.33
[58] Field of Search .............................. 395/186, 183.14; 360/60, 55, 71, 79, 99.07; 369/44.33, 58, 53; 713/200, 165, 167; 714/38

[56] References Cited

U.S. PATENT DOCUMENTS

| | | | |
|---|---|---|---|
| 4,558,176 | 12/1985 | Arnold et al. | 178/22.08 |
| 4,975,898 | 12/1990 | Yoshida | 369/100 |
| 5,014,234 | 5/1991 | Edwards, Jr. | 713/200 |
| 5,182,770 | 1/1993 | Medveczky et al. | 380/4 |
| 5,295,126 | 3/1994 | Okano et al. | 369/47 |
| 5,319,627 | 6/1994 | Shinno et al. | 369/54 |
| 5,363,352 | 11/1994 | Tobita et al. | 369/13 |
| 5,436,770 | 7/1995 | Muto et al. | 360/51 |
| 5,461,220 | 10/1995 | Ogino | 369/59 |
| 5,541,903 | 7/1996 | Funahashi et al. | 369/54 |
| 5,592,452 | 1/1997 | Yoshimoto et al. | 369/58 |
| 5,687,397 | 11/1997 | Ohmori | 395/893 |
| 5,761,301 | 6/1998 | Oshima et al. | 380/4 |
| 5,805,551 | 9/1998 | Oshima et al. | 369/59 |
| 5,826,011 | 10/1998 | Chou et al. | 713/200 |

FOREIGN PATENT DOCUMENTS

| | | | |
|---|---|---|---|
| 63-20769 | 1/1988 | Japan | G11B 20/12 |
| 63-261578 | 10/1988 | Japan | G11B 20/12 |
| 3-256225 | 11/1991 | Japan | G11B 7/00 |
| 6-314174 | 11/1994 | Japan | G06F 3/06 |
| 6-332762 | 12/1994 | Japan | G06F 12/00 |
| 7-57263 | 3/1995 | Japan | G11B 7/00 |
| 7-64841 | 3/1995 | Japan | G06F 12/00 |

OTHER PUBLICATIONS

U.S. application No. 08/750,223, filed Nov. 26, 1996.

*Primary Examiner*—Dieu-Minh T. Le
*Attorney, Agent, or Firm*—Limbach & Limbach L.L.P.

[57] ABSTRACT

The number of times installation has been performed is recorded in a recording and reproduction area of a recording medium as installation is performed. When an application program is requested to be installed to another recording medium, the number of times installation has been performed is checked and installation is performed only when the number is less than the specified number.

9 Claims, 21 Drawing Sheets

AE

ARW

AE
ARW

AE
ARW

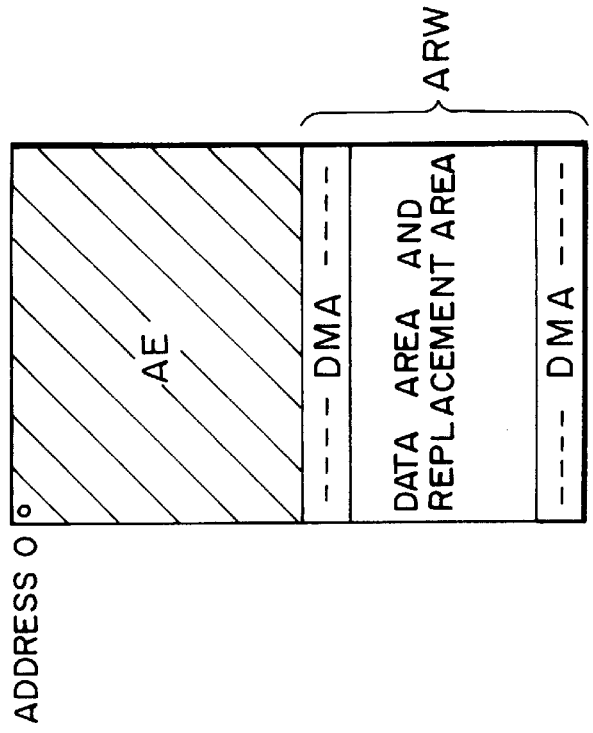
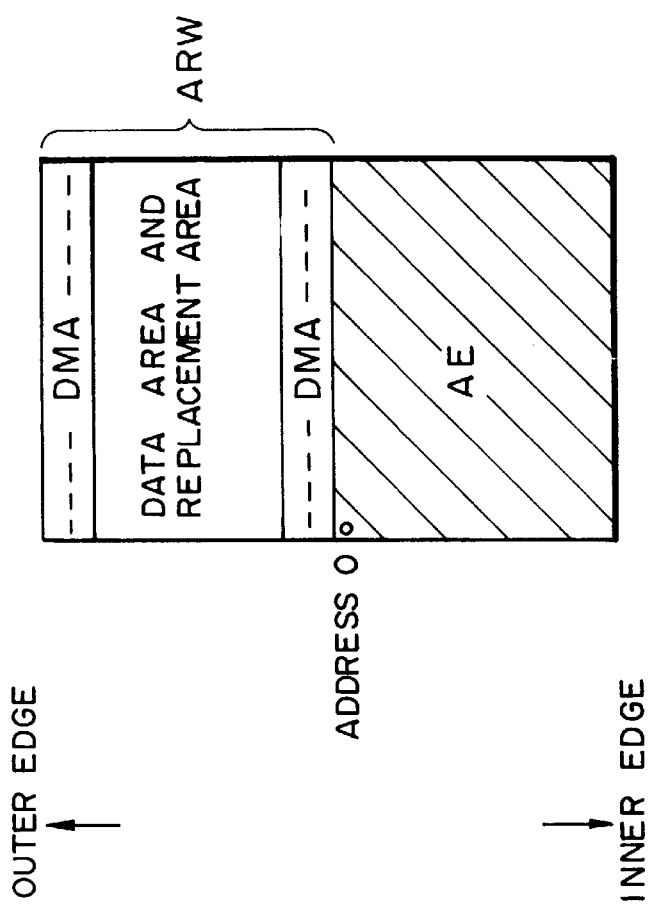

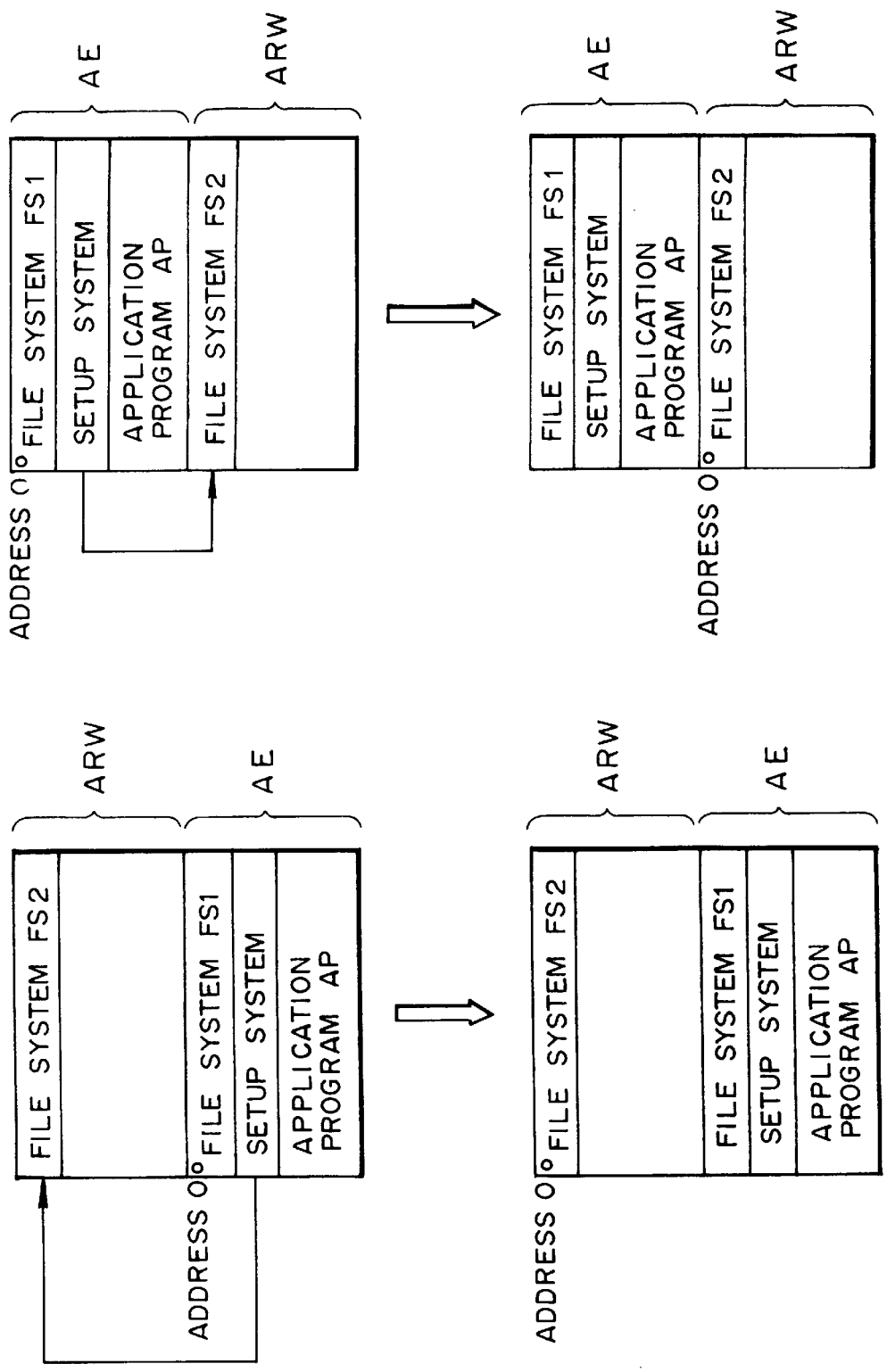

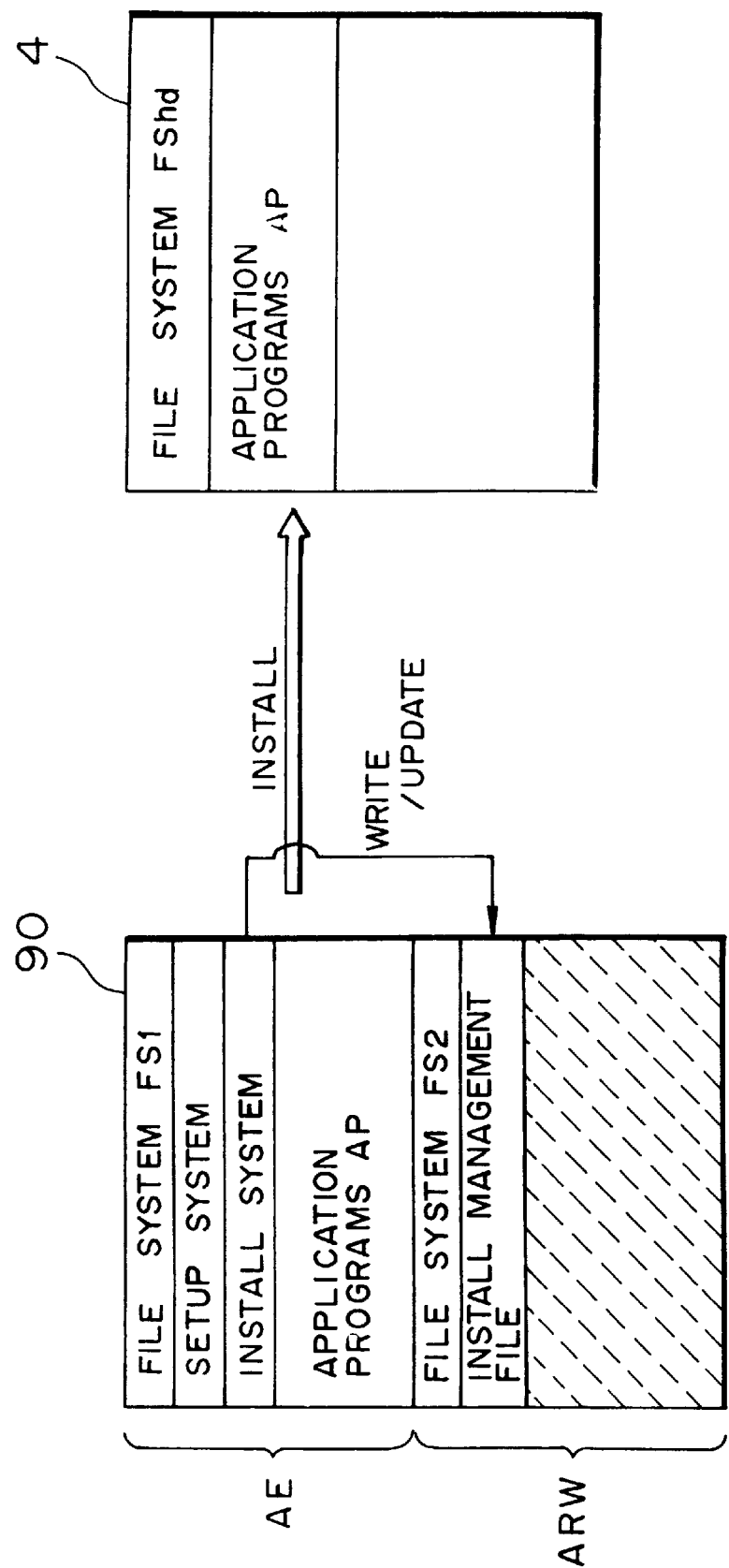

FIG. 15

| | NO. OF BYTES | |
|---|---|---|
| "INSTALL_MANAGEMENT_SECT0" | 24 | HEADER |
| NUMBER Ni OF TIMES INSTALLATION HAS BEEN PERFORMED | 4 | |
| RESERVED (NUMBER Np OF PERMITTED INSTALLATIONS) | 4 | |
| DATE (yy/mm/dd) OF FIRST INSTALLATION | 8 | |
| DESTINATION-DRIVE VERIFICATION INFORMATION (INQUIRY) IN FIRST INSTALLATION | 32 | 128 BYTES |
| DESTINATION-DIRECTORY NAME IN FIRST INSTALLATION | 64 | |
| RESERVED | 24 | |
| DATE (yy/mm/dd) OF SECOND INSTALLATION | 8 | |
| DESTINATION-DRIVE VERIFICATION INFORMATION (INQUIRY) IN SECOND INSTALLATION | 32 | 128 BYTES |
| DESTINATION-DIRECTORY NAME IN SECOND INSTALLATION | 64 | |
| RESERVED | 24 | |

(SECTOR)

| | NO. OF BYTES |
|---|---|
| "INSTALL_MANAGEMENT_SECT1" | 24 |
| RESERVED | 8 |
| DATE (yy/mm/dd) OF 16TH INSTALLATION | 8 |
| DESTINATION-DRIVE VERIFICATION INFORMATION (INQUIRY) IN 16TH INSTALLATION | 32 |
| DESTINATION-DIRECTORY NAME IN 16TH INSTALLATION | 64 |
| RESERVED | 24 |

(SECTOR)

| Nap #1 | Ver #1 | Date#1 | N#1 |
|--------|--------|--------|-----|
| DIR #1 | RESERVED | | |
| Nap #2 | Ver #2 | Date#2 | N#2 |
| DIR #2 | RESERVED | | |
| Nap#3 | Ver#3 | Date#3 | N#3 |
| DIR #3 | RESERVED | | |
| | | | |

COPY PROTECTION SYSTEM FOR RECORDING MEDIA

BACKGROUND OF THE INVENTION

1. Field of the Invention

The present invention relates to recording media suited for storing computer software, and management methods for installing application programs recorded in the recording media into other recording media such as hard disks.

2. Description of the Related Art

Various types of software used in computers have been offered with recording media such as optical disks, magneto-optical disks, magnetic disks, memory cards, and magnetic tape.

As a type of such recording media, a partial ROM disk has been developed. The partial ROM disk includes a ROM area used only for reproduction and a rewritable area (RAM area) for recording and reproduction.

It is preferred that only a legally correct user who has bought an application program stored in a medium can use the program.

Usually the user installs an application program stored in a medium such as a CD-ROM into a hard disk of the user's personal computer and uses it. If the user lends the application program to another person after the user has installed the program in his or her computer, the person can also install the program in his or her computer.

In other words, with the use of one medium, the application program can be installed one after another in different computers, illegally providing the program unlimitedly.

SUMMARY OF THE INVENTION

Accordingly, it is an object of the present invention to eliminate illegal use of an application program by preventing unlimited installation from a recording medium which stores the application program and which has at least a recording and reproduction area, such as the above-described partial ROM disk.

To this end, a recording medium records an install control means which directs a first drive unit driving the recording medium to record information concerning installation into a recording and reproduction area as install management data when an application program recorded in the recording medium is installed in another recording medium such as a hard disk.

The install management data includes at least the number of times the application program has been installed in another recording medium.

The install control means compares the number of permitted installations for an application program, recorded in the recording medium as fixed information or variable information with the number of times installation has been performed recorded as the install management data when the application program is requested to be installed, and allows the application program to be installed only when the number of times installation has been performed is less than the number of permitted installations.

When the application program is uninstalled from another recording medium to which the application program has been installed from the original recording medium, the install control means directs the first drive unit to update (decrement) the number of times installation has been performed which is recorded in the install management data.

The install control means directs the first drive unit to record verification information for identifying another recording medium in the recording and reproduction area as the install management data as the application program is installed to the another recording medium, and the install control means references the verification information when the application program is requested to be uninstalled and does not uninstall the application program irrespective of an uninstallation request when it is determined that the application program to be uninstalled from the other recording medium has not been installed from the original recording medium.

In an installation management method for installing an application program from such a recording medium, the number of times installation has been performed is recorded in a recording and reproduction area of a recording medium as installation is performed, the number of times installation has been performed which is recorded in the recording medium is checked when an application program is requested to be installed to another recording medium, and installation is performed only when the number is less than the specified number.

In uninstallation, it is determined from the verification information and the number of times installation has been performed whether the recording medium corresponds to an application program to be uninstalled from another recording medium, and according to this determination result, whether uninstallation is to be performed is decided.

In the present invention, the number of times installation has been performed is recorded in a recording medium serving as a software medium in which an application program is recorded, and installation of more than the specified number of times is inhibited. Installation is controlled in this way so as to prevent unlimited installations. Also uninstallation is allowed only when the installation source and the installation destination correspond correctly.

BRIEF DESCRIPTION OF THE DRAWINGS

FIGS. 5A and 5B are views showing conditions of the partial ROM disk before it is logically formatted.

FIGS. 6A and 6B are views showing conditions of the partial ROM disk after it is logically formatted.

FIG. 14 illustrates installation from the partial ROM disk according to the embodiment.

FIG. 15 shows a structure of an install management file according to the embodiment.

DETAILED DESCRIPTION OF THE PREFERRED EMBODIMENTS

Recording media and installation management methods according to embodiments of the present invention will be described below in the following order. A partial ROM disk is taken as an example of recording media in the embodiments.

Figure 1A:
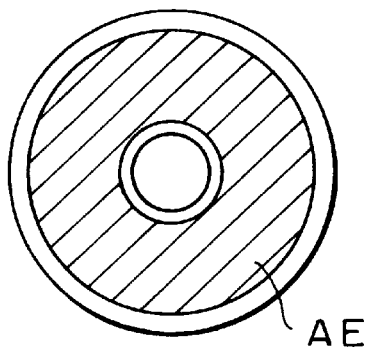
FIGS. 1A, 1B, 1C, and 1D show various types of disks.
Figure 1B:
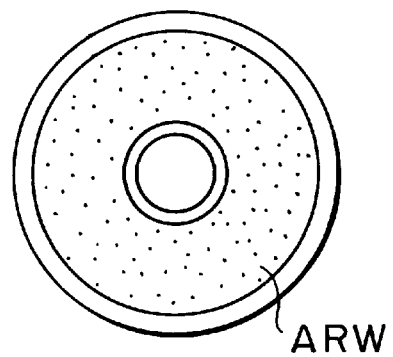

1. Area configuration of a partial ROM disk
2. Formatting
3. Configuration of a recording and reproduction apparatus
4. System operations
5. Installation
6. Uninstallation
7. Various disks 1. Area Configuration of a Partial ROM Disk FIGS. 1A to 1D show various disk media. FIG. 1A shows a ROM disk having a main data area which entirely works as a reproduction-only area (ROM area) AE formed by, for example, embossed pits. FIG. 1B illustrates a RAM disk having a main data area which entirely works as a recording and reproducing rewritable area ARW, such as a magneto-optical area.

Figure 1C:
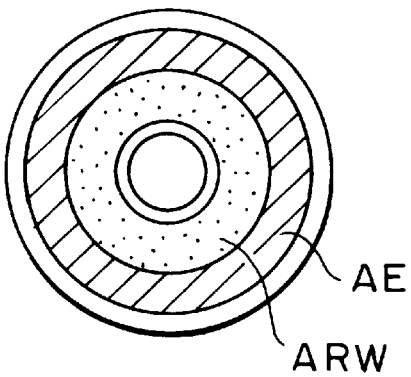
Figure 1D:
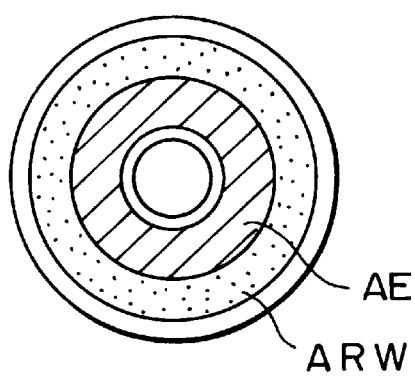

A partial ROM disk, which serves as a recording medium in the present embodiment, has a structure shown in FIG. 1C or FIG. 1D. In the main data area, a partial ROM disk has both a ROM area AE and a rewritable area ARW.

Figure 2:
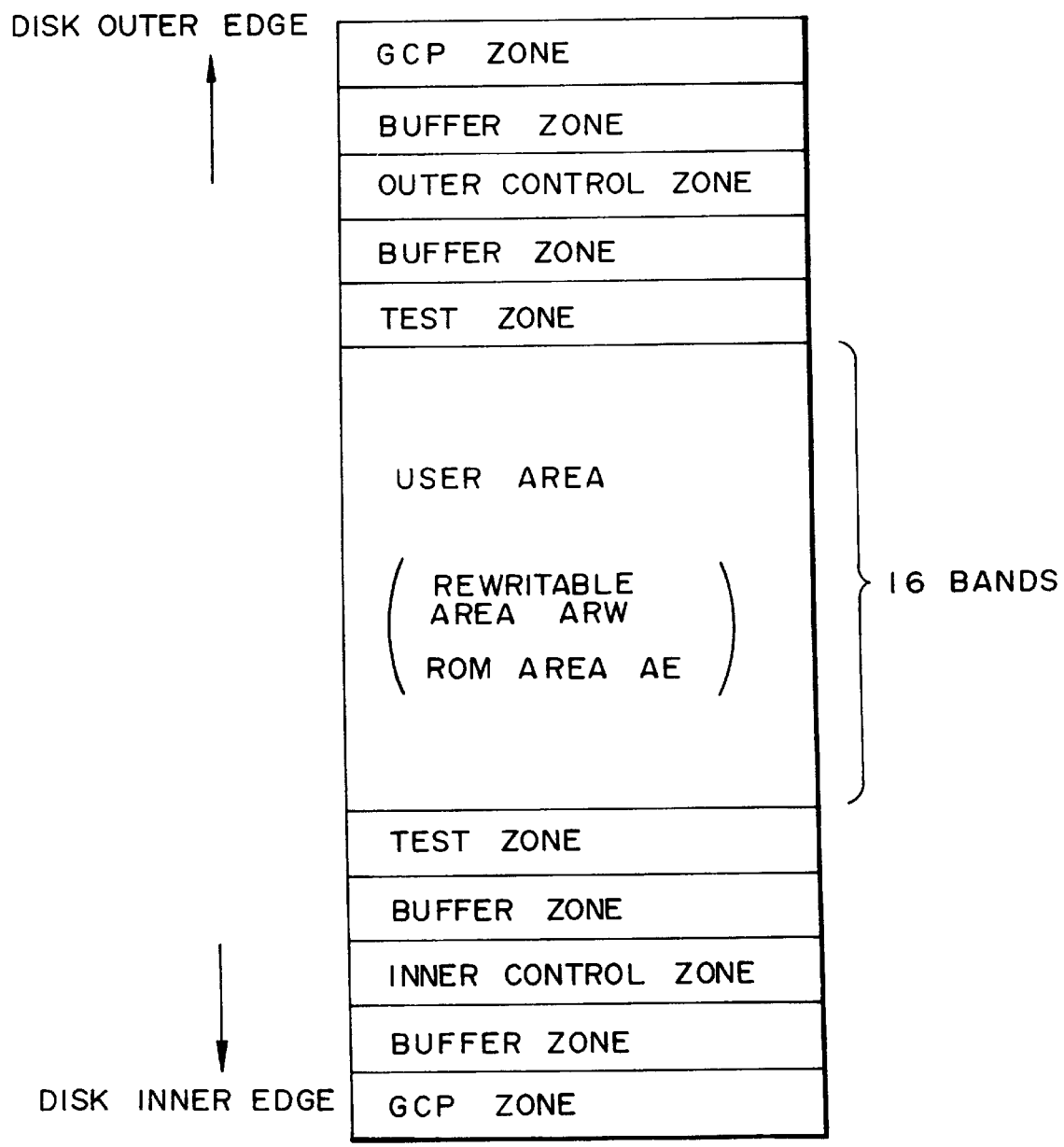
FIG. 2 is a view illustrating an area structure of a partial ROM disk.

FIG. 2 shows the area structure of the partial ROM disk from the outer edge to the inner edge.

Near the outer edge, a GCP zone of 736 tracks is provided. Toward the inner edge, a buffer zone of two tracks, an outer control zone of five tracks, a buffer zone of two tracks, a test zone of five tracks are also provided. Next to the test zone, a user area which serves as a main data area including a reproduction-only ROM area AE and a rewritable area ARW into which the user can record the desired data is provided.

Toward the inner edge from the user area, a test zone of five tracks, a buffer zone of two tracks, an inner control zone of five tracks, a buffer zone of two tracks, and a GCP zone of 820 tracks are provided.

The GCP zones, the outer control zone, and the inner control zone record the specified control information.

This partial ROM disk is a so-called zone CAV disk and the user area is divided into 16 bands (16 zones).

The manufacturer can specify the ratio of a rewritable area ARW to the ROM area AE in the 16 bands.

Figure 3B:
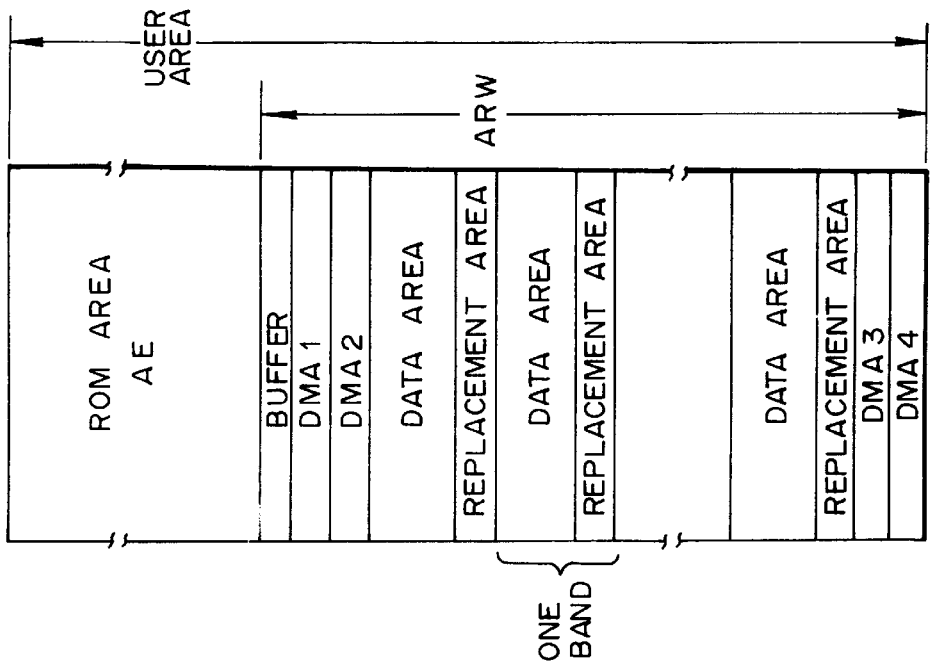
FIGS. 3A and 3B are views illustrating user-area structures of the partial ROM disk.
Figure 3A:
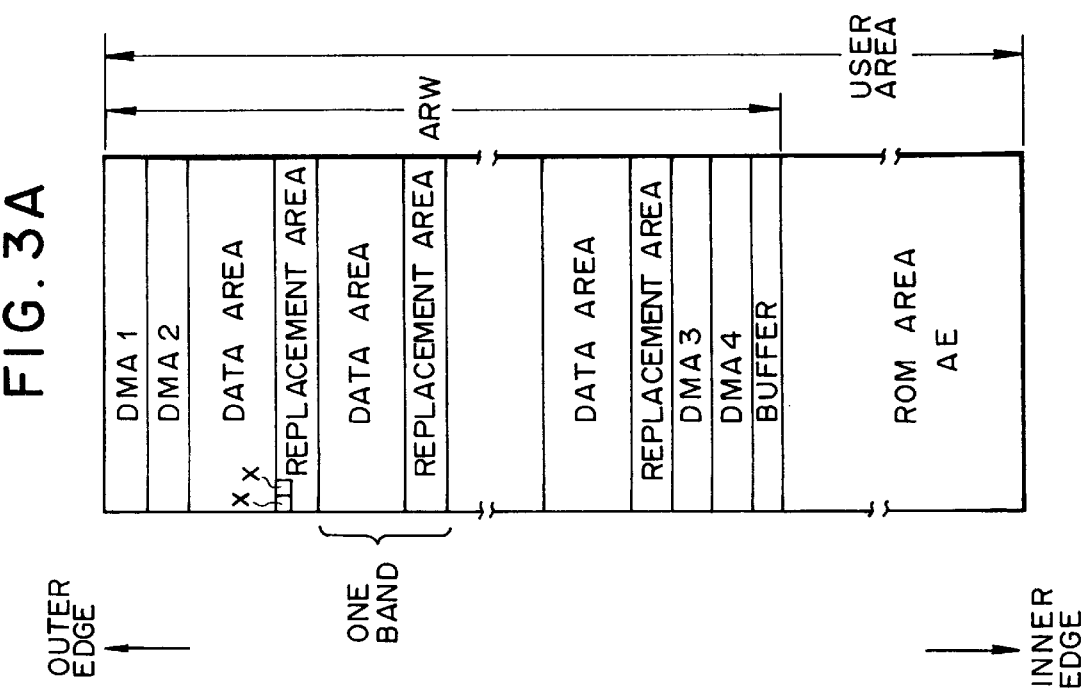

FIGS. 3A and 3B show in detail the structure of the rewritable area ARW in the user area having 16 bands. FIG. 3A illustrates a case in which a rewritable area ARW is provided closer to the disk outer edge than a ROM area is. FIG. 3B illustrates a case in which a rewritable area ARW is provided closer to the disk inner edge than a ROM area is.

In each figure, at the top of the rewritable area ARW, defect management areas DMA1 and DMA2 are provided. At the end of the writable area ARW, defect management areas DMA3 and DMA4 are also provided. An area adjacent to the ROM area AE serves as a buffer area.

In every band, a data area and a replacement area for the data area are provided. Therefore, when the rewritable area ARW occupies n bands in the 16 bands, n data areas and n replacement areas are provided. If a data area has a defective portion in which either recording or reproduction, or both cannot be done due to, for example, scratches, the corresponding replacement area offers a portion which is used as a substitute for the defective portion.

As shown in FIG. 3A, if a data area has the defective portions indicated by crosses, recording portions substituting for the portions having crosses are specified at the positions indicated by arrows in the corresponding replacement area.

The defect management areas DMA1 to DMA4 control such a replacement condition and record information used for enabling appropriate recording and reproduction at portions other than defective portions.

In physical formatting of a disk, a data area is searched for a defective portion, a portion substituting for a defective portion, if any, is specified in the corresponding replacement area, and information for the defect management areas DMA1 to DMA4 is created and recorded in the rewritable area ARW. In other words, a disk is set to the state shown in FIG. 3A or 3B by physical formatting, and the rewritable area ARW is set such that recording and reproduction is physically enabled.

To actually write a file into a rewritable area ARW, it is necessary to perform logical formatting to a disk which has been physically formatted and to write a file system which controls recording and reproduction in the rewritable area ARW. After physical formatting and logical formatting are performed, the user can use a partial ROM disk as a software medium having a rewritable area ARW.

2. Formatting Formatting a partial ROM disk will be described below.

Figure 4C:
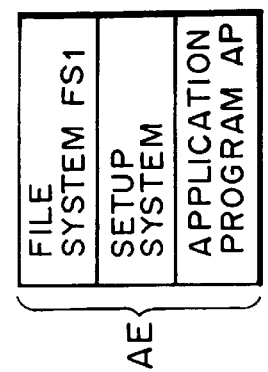
FIGS. 4A, 4B, and 4C are views showing conditions of the partial ROM disk before it is physically formatted.
Figure 4B:
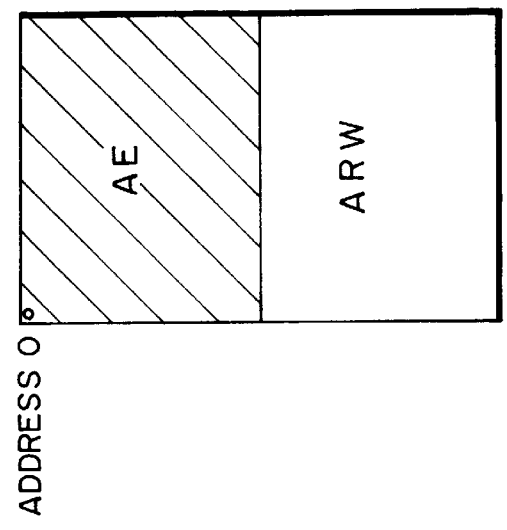
Figure 4A:
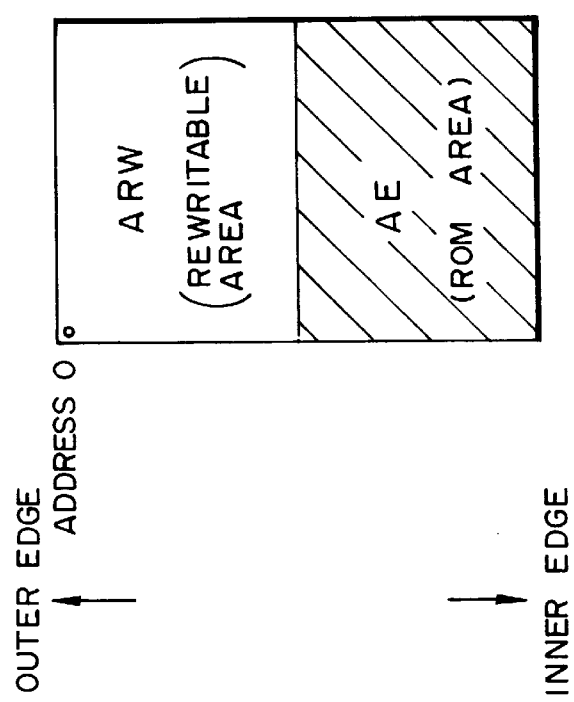

FIG. 4A or 4B shows a disk which has not yet physically formatted. FIG. 4A illustrates a case in which a rewritable area ARW is provided closer to the outer edge of a user area than a ROM area is. FIG. 4B illustrates a case in which a rewritable area ARW is provided closer to the inner edge of a user area than a ROM area is.

When a disk is not formatted, its rewritable area ARW is just a magneto-optical area and area management has not yet been done. However, necessary data has already been recorded in the ROM area AE, where data is recorded with the use of, for example, embossed pits.

Data recorded in the ROM area AE usually includes a file system for data management information in the ROM area AE and an application program which can be read according to the file system. As shown in FIG. 4C, the ROM area AE of a partial ROM disk formatted as described above records a file system FS1 at the top, and next recorded are a setup program and an application program AP which can be read according to the file system FS1.

The setup system is a tool for logical formatting of a disk. When a disk is loaded into a recording and reproduction apparatus which will be described later by referring to FIG. 11, for example, logical formatting, which enables the rewritable area ARW to be used, is performed by driving the setup system from the host computer.

A system configuration and system operations will be described later. The partial ROM disk is loaded into a recording and reproduction apparatus connected to the host computer and used by the user. When viewed from the user, a disk which has been physically formatted is offered.

And, the user applies logical formatting to the disk as an initial operation by the user system.

Physical formatting and logical formatting of a partial ROM disk will be described by referring to FIGS. 4 to 10. Each formatting can be done either by a manufacturer system (the host computer and the recording and reproduction apparatus) or by a user system. As a way to offer a software medium, a disk is physically formatted by a manufacturer system and logically formatted by the user system.

Figure 7:
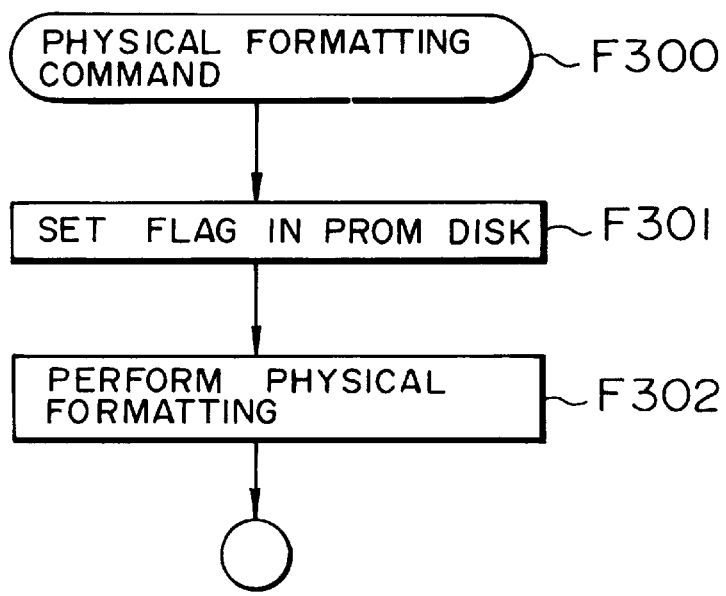
FIG. 7 is a flowchart of physical formatting.
Figure 8:
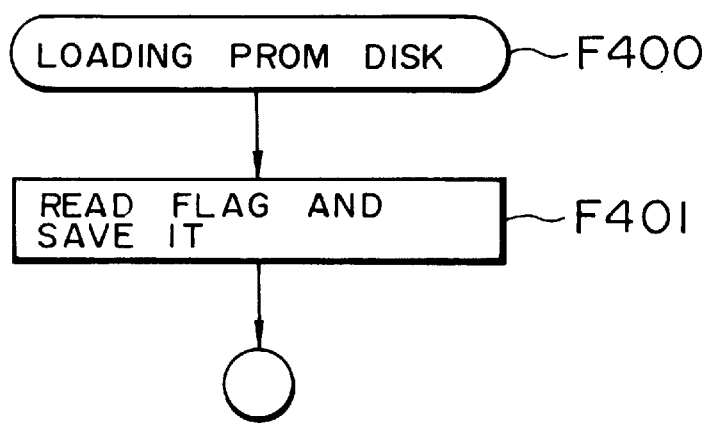
FIG. 8 is a flowchart of processing performed when a partial ROM disk is loaded.
Figure 9:
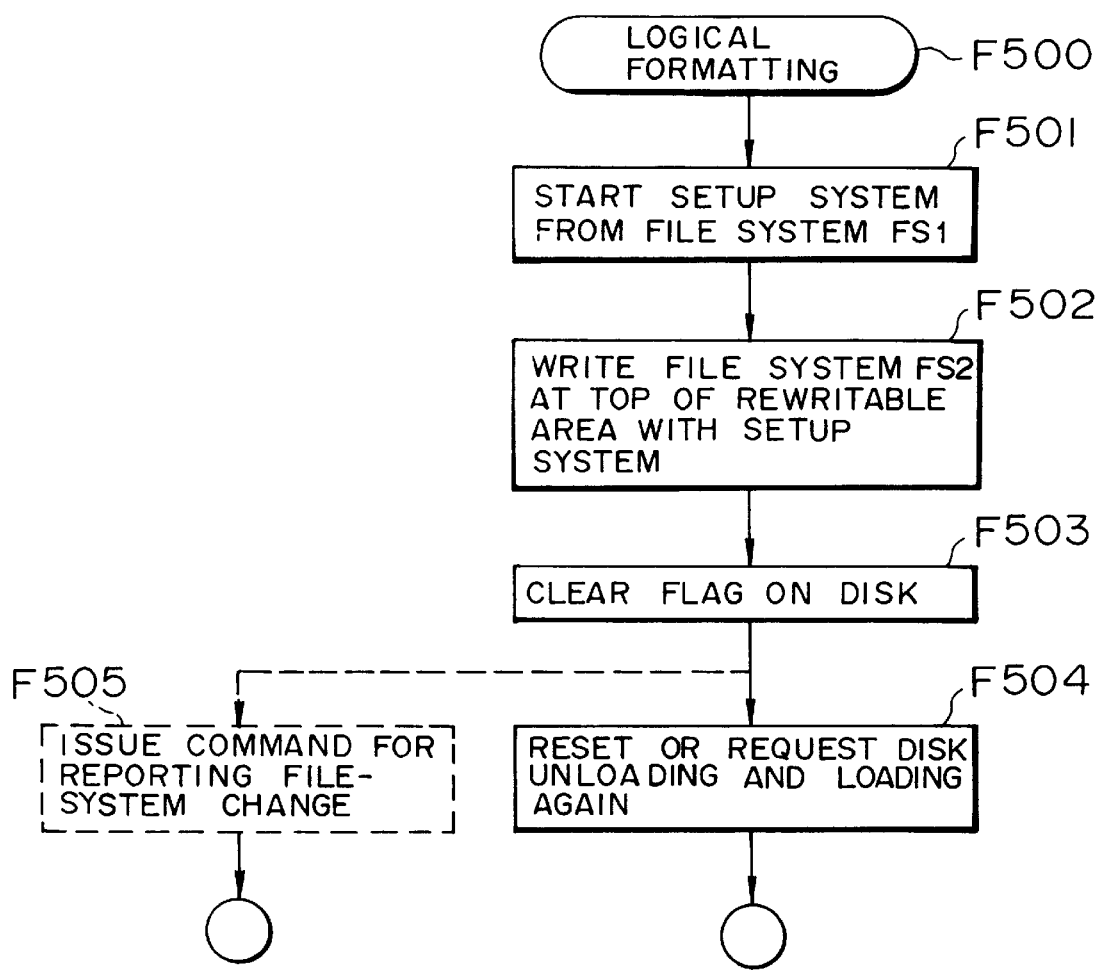
FIG. 9 is a flowchart of logical formatting.

The recording and reproduction apparatus performs processing which will be noted in descriptions for FIGS. 7 to 9 when a device driver controlled by the file system and the setup system read from a disk to the host computer request the specified read/write operations to the recording and reproduction apparatus. Such a system operation will be described in detail later.

Before physical formatting is performed, the top location of the user area in a disk is determined to have address 0. Therefore, the top of the rewritable area ARW has address 0 in FIG. 4A, and the top of the ROM area AE has address 0 in FIG. 4B.

The disk shown in FIG. 4A or 4B is physically formatted as shown in FIG. 5A or 5B and shipped as a software medium.

In other words, by physical formatting, a data area is searched for a defective portion in the rewritable area ARW, a portion substituting for a defective portion, if any, is specified in the corresponding replacement area, and information for the defect management areas DMA1 to DMA4 is created, in order to set the rewritable area ARW to a physically recording and reproduction enable condition. And then the disk is shipped.

In physical formatting, a driver (the recording and reproduction apparatus and the host computer controlling the apparatus) for performing physical formatting does the processing shown in FIG. 7. When physical formatting starts (F300), the specified flag is set in a partial ROM disk to be formatted (F301) and actual formatting is done such as the above-described defect management (F302). The order of steps F301 and F302 may be reversed. In either case, the flag is set in physical formatting.

The flag may be set either in a vendor-unique area of the top sector in the rewritable area ARW or in a reserved area of a defect management area. In either case, it is necessary to set the flag at the position specified in advance.

When the flag is set, the recording and reproduction apparatus to which the disk is loaded recognizes that the top of the ROM area AE in the disk has address 0 as shown in FIGS. 5A and 5B.

Physical formatting is performed in the way described above, for example, and a partial ROM disk in which the flag has been set is shipped. When such a partial ROM disk is loaded into a recording and reproduction apparatus (and the host computer) of the user, the processing shown in FIG. 8 is done first. When the disk is loaded (F400), the flag recorded at the specified position, such as the top of the rewritable area ARW, is read and the flag state is stored (F401).

Figure 10:
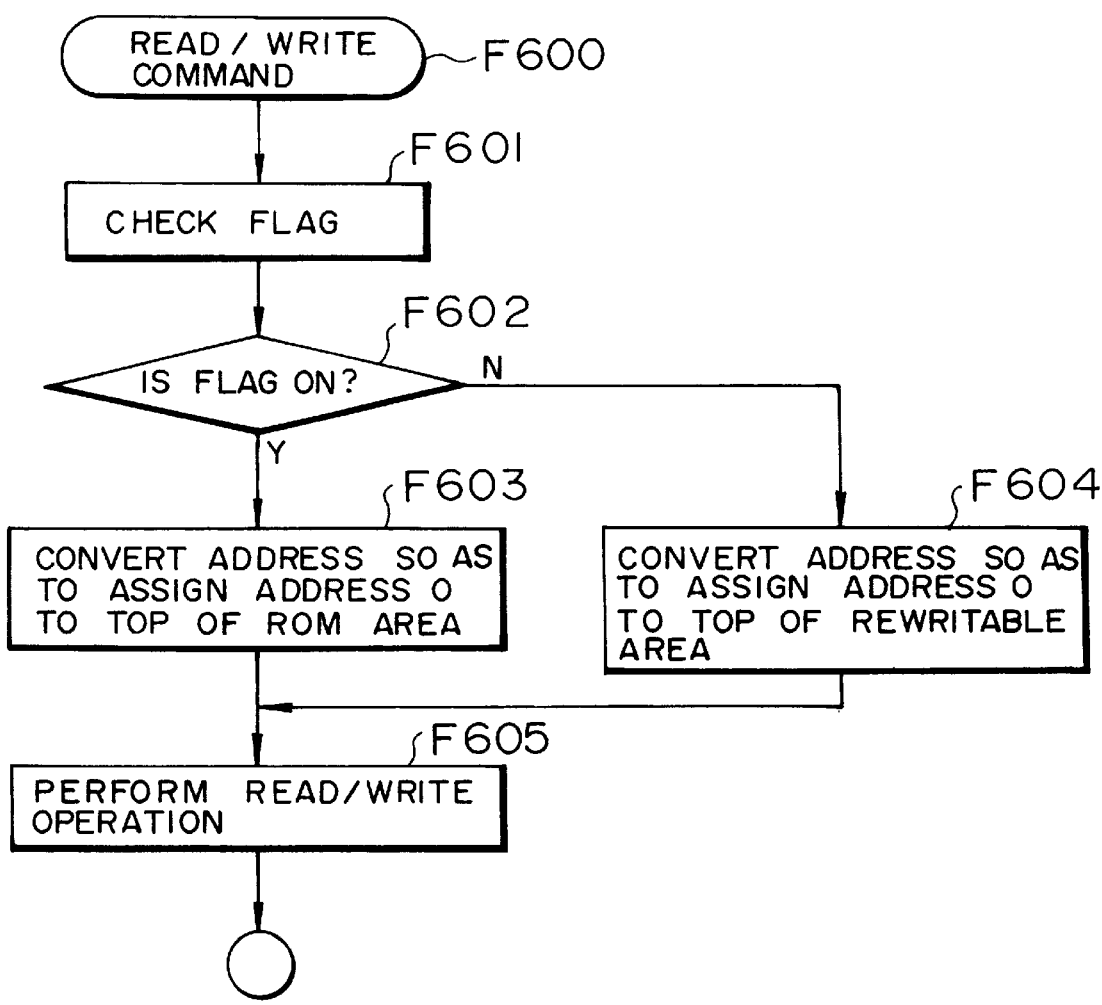
FIG. 10 is a flowchart of processing performed when a read/write command is issued.

When the host computer issues a read/write command as shown in FIG. 10, the recording and reproduction apparatus checks the flag (F601). When the flag is on, the processing proceeds to step F603 from step F602. Address conversion is performed such that the top of the disk ROM area AE has address 0, and then the requested recording or reproduction is done in step F605.

Since the flag is on in a disk which has just been physically formatted, the recording and reproduction apparatus recognizes the top of the ROM area AE as address 0 as shown in FIGS. 5A and 5B, and accesses the top area of the ROM area AE first.

The host computer and the recording and reproduction apparatus of the user system, for example, can apply logical formatting to a disk which has been physically formatted as described above.

FIG. 9 is a flowchart of logical formatting according to control from the host computer.

When logical formatting starts (F500), the recording and reproduction apparatus accesses the disk at address 0. Since address 0 is assigned to the top of the ROM area AE at this time, the file system FS1 recorded at the top of the ROM area AE is read.

The host computer recognizes the setup system stored in the ROM area AE by reading the file system FS1, which controls the ROM area AE, and starts the setup system (F501).

The setup system recorded in the ROM area AE is a logical formatting tool. According to this tool, the host computer writes a file system FS2 for controlling application programs stored in the rewritable area ARW and the ROM area AE into the top area of the rewritable area ARW (F502).

Since the data constituting the file system FS2 is recorded in advance in the setup system, the file system FS2 can be written by starting the setup system.

With the processing to step F502, the disk shown in FIG. 5A changes to that shown at the upper part in FIG. 6A, and the disk shown in FIG. 5B changes to that shown at the upper part in FIG. 6B. Since the file system FS2 is written, the rewritable area ARW is enabled to be controlled in recording and reproduction.

Next, the host computer clears the flag in step F503, which is set in physical formatting.

The host computer requests the user to reset and restart, or to unload the disk and then load it again, and the processing is terminated (F504).

After the system is reset, or the disk is unloaded and then loaded, the flag is read in the processing shown in FIG. 8. If the disk has already been logically formatted, it is determined that the flag is off.

When the host computer issues a read/write command to the disk as shown in FIG. 10 (F601), the recording and reproduction apparatus checks the flag (F601). Since the flag is off, the processing proceeds to step F604 from step F602. Address conversion is performed such that the top of the disk rewritable area ARW has address 0, and then the requested recording or reproduction is done in step F605.

In a disk which has been logically formatted, the recording and reproduction apparatus recognizes that the top of the rewritable area ARW has address 0 as shown in the lower parts in FIGS. 6A and 6B. Therefore, when a read/write operation is requested, the file system FS2 is first accessed. Since the file system FS2 has information for controlling files in the ROM area AE, files in the rewritable area, and a not-yet-recorded area, the host computer can read data files from the ROM area AE and, in addition, can,record or reproduce the desired data in or from the rewritable area ARW.

Some host computers store a file system read from a loaded medium, even after reset. In this case, even when the computers are restarted after logically formatting a disk, they start operations according to the file system FS1 read before logical formatting. In these computers, it is necessary to set step F505 shown in FIG. 9 to report a change in file system such that a new file system, that is the file system FS2, is read in subsequent re-start operations.

As described above, in this formatting method, the flag is set when physical formatting is done, and the recording and reproduction apparatus recognizes that the top of the ROM area AE has address 0 by the set flag. Therefore, the apparatus accesses the file system FS1, which is recorded at the top of the ROM area AE at that time, and starts an application program AP stored in the ROM area AE. Logical formatting can be done by starting the setup system, and the disk can also be used as a ROM medium at this time.

When a disk is logically formatted, the flag is cleared. The recording and reproduction apparatus recognizes that the top of the rewritable area ARW has address 0 by the flag cleared. Therefore, the file system FS2, which is recorded at the top of the rewritable area ARW, can be accessed after logical formatting. This means that in addition to the ROM area AE, the rewritable area ARW can also be used.

With these types of formatting operations, it becomes not necessary to perform logical formatting before a disk is shipped, and a partial ROM disk can be used by an existing operating system. When the file system FS1 is recorded by an FAT system, for example, into the ROM area such that most operating systems can read it, it provides higher versatility.

Furthermore, even if the file system FS2 is destroyed, for example, the rewritable area ARW of the disk can be available by again applying physical formatting and logical formatting.

3. Configuration of a Recording and Reproduction Apparatus

Figure 11:
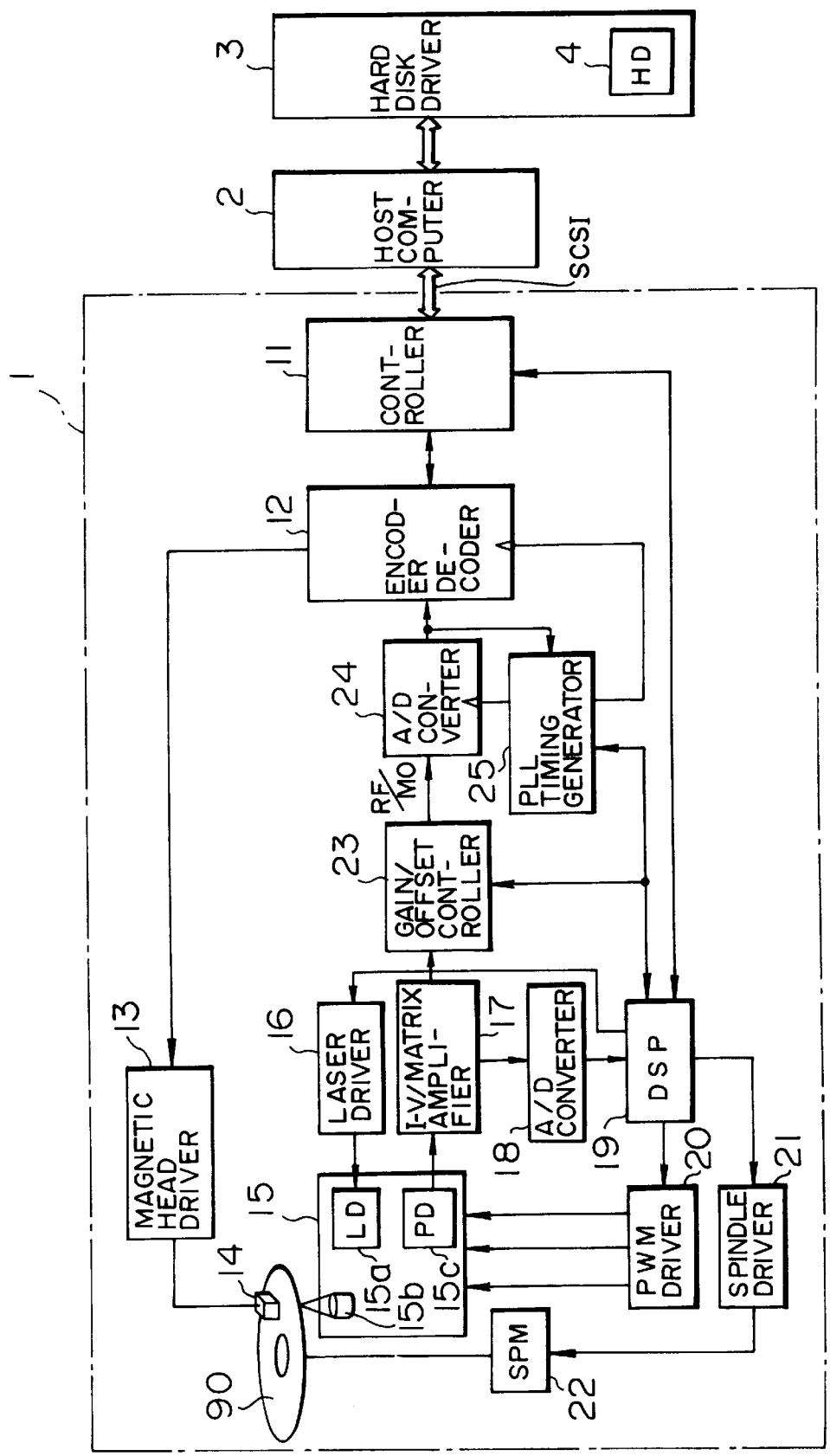
FIG. 11 is a block diagram of a recording and reproduction apparatus according to an embodiment.

FIG. 11 shows a configuration of a recording and reproduction apparatus.

The recording and reproduction apparatus 1 is configured such that it can send and receive commands and data to and from the host computer 2 (personal computer in some cases) connected through the SCSI interface. The apparatus 1 records data in a disk 90 according to commands and data received from the host computer 2. The apparatus 1 also read data from the disk 90 according to commands received from the host computer 2 and supplies the data to the host computer 2. The disk 90 is a partial ROM disk described above.

A controller 11 controls communications with the host computer 2, and recording and reproduction operations of the recording and reproduction apparatus 1.

The controller 11 executes actual recording and reproduction operations through a digital signal processor (DSP) 19. The DSP 19 has a function of a so-called servo driver. The DSP 19 sends a spindle drive controlling signal to a spindle driver 21 according to a rotation command sent from the controller 11 to apply a drive signal to a spindle motor 22. Then, the disk 90 rotates. During rotation, rotation speed information obtained by a rotation speed detection mechanism (not shown) and the reference rotation speed are compared and a drive signal corresponding to their difference is applied to the spindle motor. Hence, a CAV-method (constant angular velocity) spindle rotation is implemented.

To emit a laser from a laser diode 15a in an optical head 15, the DSP 19 sends a drive controlling signal to a laser driver 16 to control laser emission. Laser light emitted from the laser diode 15a passes through an optical system (not shown) and illuminates the disk 90 through an objective lens 15b. Light reflected from the disk 90 passes through an optical system (not shown), illuminates a photodetector 15c, and is taken out as an electric signal.

The electric signal obtained by the photodetector 15c is sent to an I–V/matrix amplifier 17. It is converted from current to voltage, and then various signals are taken out from it by a matrix-operation amplifier. They include an RF signal which is to be reproduction data from the ROM area AE in the disk 90, an MO signal which is to be reproduction data from the rewritable area ARW in the disk 90, a focus error signal, a tracking error signal, and a front APC signal.

The focus error signal, the tracking error signal, and the front APC signal are converted to digital data and sent to the DSP 19.

According to the focus error signal and the tracking error signal, the DSP 19 generates servo driving signals and sends them to a PWM driver 20. The PWM driver 20 supplies driving power to a focus coil, a galvano motor, and a slide motor placed in the optical head 15.

Receiving a focus servo driving signal based on the focus error signal, the PWM driver 20 supplies driving power to the focus coil. The objective lens is driven to approach or separate from the disk in focus control. Receiving a tracking servo driving signal and a slide servo driving signal according to the tracking error signal, the PWM driver 20 supplies driving power to a tracking motor and the slide motor for tracking control and sled-movement control.

The DSP 19 controls the laser driver 16 according to the front APC signal to maintain an appropriate laser level.

Data read from the disk 90 during reproduction is obtained as an RF signal or an MO signal from the I–V/matrix amplifier 17. The output of the I–V/matrix amplifier 17 is set to an appropriate voltage level by a gain/offset controller 23 and digitalized by an A/D converter 24.

The digitalized signal is sent to an encoder/decoder 12 and converted to a reproduced data with digital filter processing, Viterbi decoding, non-return-to-zero (NRZ) decoding, and descramble processing.

The reproduced data is sent to the host computer 2 through the controller 11 (with the interface function of the controller 11).

To generate a reproduction clock and various timing signals synchronized with a reproduction signal used in reproduction, the output of the A/D converter 24 is also sent to a PLL timing generator 25. With so-called PLL operations, a reproduction clock and various timing signals based on the reproduction clock are generated.

When the host computer 2 sends a recording request command and data to be recorded, the controller 11 sends the data to the encoder/decoder 12 to encode the data in the form used in actual recording on the disk 90. The encoded data is sent to a magnetic-head driver 13. The magnetic-head driver 13 applies a magnetic field to the disk 90 by the magnetic head 14 according to the data.

In recording, the laser diode 15a emits a high-level laser for recording.

A hard disk drive 3 for recording and reproduction on and from a hard disk 4 is built in or connected to the host computer 2.

When the user purchases software in the form of a partial ROM disk, the user loads the disk 90 to the recording and reproduction apparatus 1, and installs an application program recorded in the disk 90 to the hard disk 4. And then, the user uses the function of the application program by manipulating the hard disk drive 3 with operations on the host computer 2 to read the program from the hard disk 4.

4. System Operations

Figure 12:
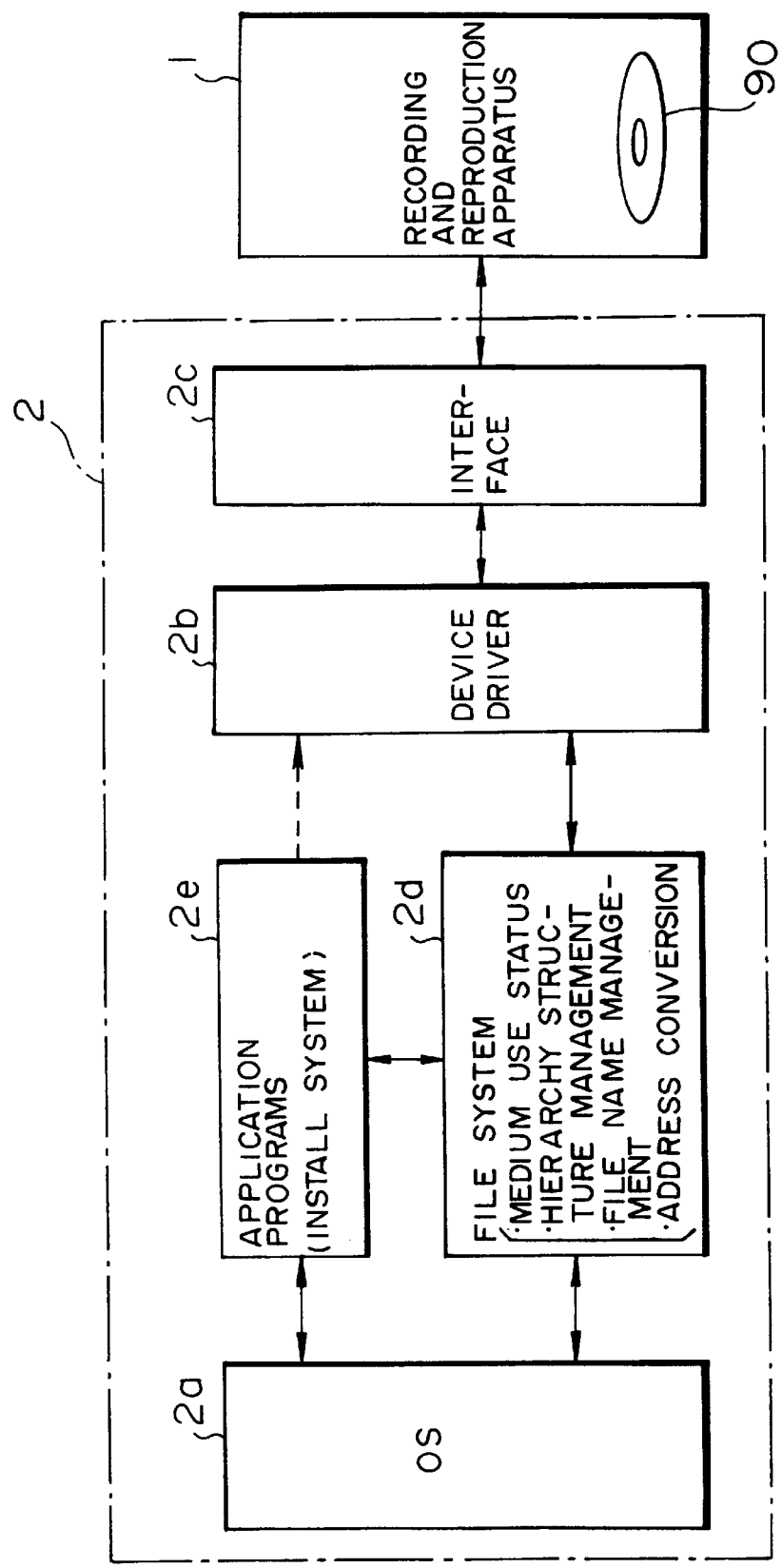
FIG. 12 is a view showing system operations according to the embodiment.

FIG. 12 typically shows an operation performed when the host computer 2 manipulates the disk 90 with the use of the recording and reproduction apparatus 1.

In the disk 90 according to the present embodiment, the various data files and the file systems (FS1 and FS2) described in the formatting section are recorded.

To perform recording or reproduction for the disk 90, the host computer 2 needs to read a file system from the disk 90.

The operating system 2a (hereinafter called OS) of the host computer 2 directs the recording and reproduction apparatus 1 to perform recording/reproduction with use of the file system 2d read from the disk 90 to the specified storage area in the host computer 2 as shown in FIG. 12. The file system is read from the disk 90 when the disk 90 is loaded into the recording and reproduction apparatus 1 and when the system is started, for example.

The file system controls the use statuses of a disk medium, such as the use/not-use condition of each portion (zone, cluster, and sector, for example) in the user area from the outer edge to the inner edge of the disk 90 and unusable area setting. The directory structure of a recorded data file and its file name are also controlled in hierarchy structure management.

In addition, the file system has a function for address conversion from a file name specified for read/write operation. Address conversion means that the file name specified by the OS 2a for a read/write operation is converted to the corresponding logical address on the actual disk 90. In this address conversion, a cluster serving as a data file is converted to the corresponding logical address on the disk 90.

When a new file name is generated to form a new file, the name is converted to a logical address in an area not used in the disk 90.

When the OS 2a requests read or write operation for the disk 90, the OS 2a sends the target file name and a read or write command to the file system 2d.

The file system 2d checks the use statuses of the medium and the directory according to the file name and the command to understand the structure of the disk 90. Then, the file name is converted to a logical address.

With such address conversion, the file system 2d sends the read/write command, the logical address, the length of the file, the memory address of the transfer destination in the host computer 2 to a device driver 2b. The device driver 2b does processing such as conversion from a logical address to the corresponding actual physical address on the disk 90 (this processing may be done by the file system 2d or by the recording and reproduction apparatus 1), and sends the command, the address, and the length to the recording and reproduction apparatus 1 through an interface 2c. The recording and reproduction apparatus 1 reads or writes the specified data file or the specified program file. To write into the disk 90, it is needless to say that actual data or an actual data file needs to be sent to the recording and reproduction apparatus 1.

Various data read from the disk 90, such as data files and application programs, is stored in the specified storage area in the host computer and used, or installed into the hard disk 4.

When an application program 2e is started in the host computer 2, the program runs under the control of the OS 2a. When the application program 2e requests read or write operation for the disk 90, the program 2e sends the target file name for the read/write operation and a read or write command to the file system 2d.

The file system 2d checks the use statuses of the medium and the directory and does address conversion according to the file name and the command, and sends the command, the address, and the length to the device driver 2b. The device driver 2b executes a read or write operation for the recording and reproduction apparatus 1.

An install system recorded in the disk 90 as an installer is read by the host computer 2 and functions as an application program 2e in installation and uninstallation which will be described later.

5. Installation

Operations performed when an application program recorded in the partial ROM disk according to the present embodiment is installed into the hard disk 4 shown in FIG. 11, for example, will be described below.

Figure 13:
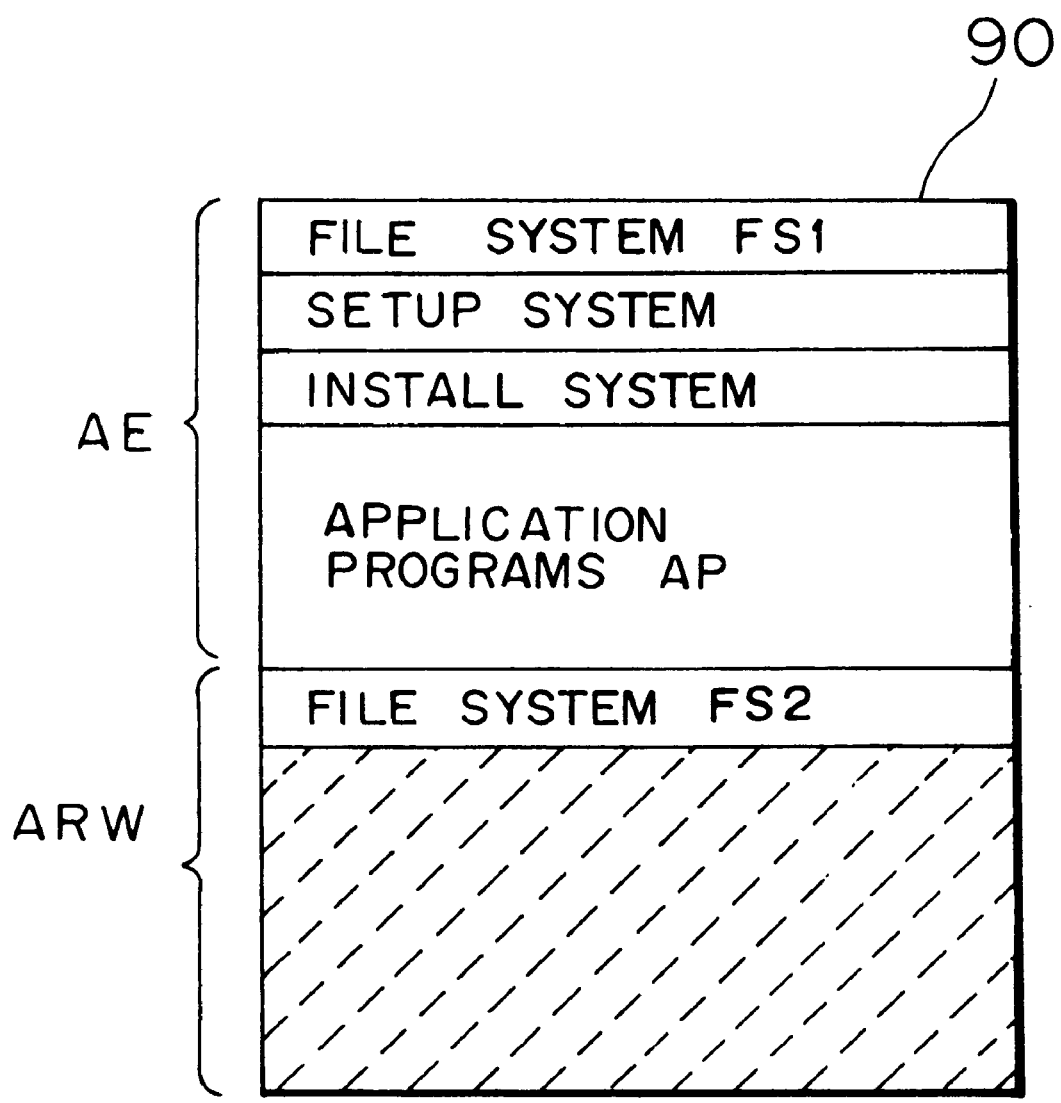
FIG. 13 is a view showing the contents of the partial ROM disk according to the embodiment.

FIG. 13 shows a typical state of the disk 90 to which physical formatting and logical formatting have been applied. This state corresponds to that shown at the lower portion of FIG. 6B. The disk 90 includes the ROM area AE and the rewritable area ARW as described above. In the ROM area AE, which stores data at embossed pits, the file system FS1, the setup system, the install system, and application programs (AP) are recorded.

As described above, the file system FS1 controls files recorded in the ROM area AE in the disk until logical formatting is executed.

In other words, even when the rewritable area ARW is just a magneto-optical area and actual area management is not done, necessary data as a software medium has already been recorded in the ROM area AE. In the present embodiment, the setup system, the install system, and an application program AP offered as actual software are recorded. The file system FS1 can control and start these program data items.

The setup system is program data serving as a tool for disk logical formatting as described before in the formatting section. When the disk 90 is loaded into the recording and reproduction apparatus 1 shown in FIG. 11 and the file system FS1 is read by the host computer 2 as described above by referring to FIG. 12, for example, the file system FS1 (file system 2d in FIG. 12) can start the setup system to execute logical formatting so as to make the rewritable area ARW available. Before logical formatting, it is recognized that the top of the ROM area AE, namely the file system FS1, has address 0. The file system FS1 is first accessed, and the setup system is made ready.

In logical formatting by the setup system, the file system FS2 for controlling data (application programs) in the rewritable area ARW and the ROM area AE is written at the top of the rewritable area ARW, as shown in FIG. 13.

After logical formatting, address 0 is assigned to the top of the rewritable area ARW, that is, the file system FS2. In other words, the file system FS2 is first accessed when a disk is loaded, and thereby recording and reproduction management in the rewritable area ARW as well as data read management in the ROM area AE are enabled. The file system FS2 is used as the file system 2d shown in FIG. 12, and various types of use of a partial ROM disk in areas including the rewritable area ARW can be made.

A hatched portion shown in FIG. 13 indicates an area left for writing data.

In the present embodiment, a partial ROM disk can be used after it is logically formatted by the setup system. The file system FS1 may control the disk such that a file exists in the rewritable area ARW before setup (namely, when the file system FS2 has not yet existed). An install management file which will be described later may correspond to such a file, for example. In this case, it can be set that the install management file is transparent to the file system FS1, or the install management file is handled as a reproduction-only file. As will be described later in detail, the application program (install system) 2e read by the host computer 2 can directly control the device driver 2b without the use of the file system 2d (FS1) to read/write files such as the install management file.

It is possible to install an application program without logical formatting. It is also possible to provide software for directly starting an application program without being installed.

To use an application program AP stored in the disk 90, in the host computer 2 shown in FIG. 11, the application program AP is usually installed into the hard disk 4.

Figure 16:
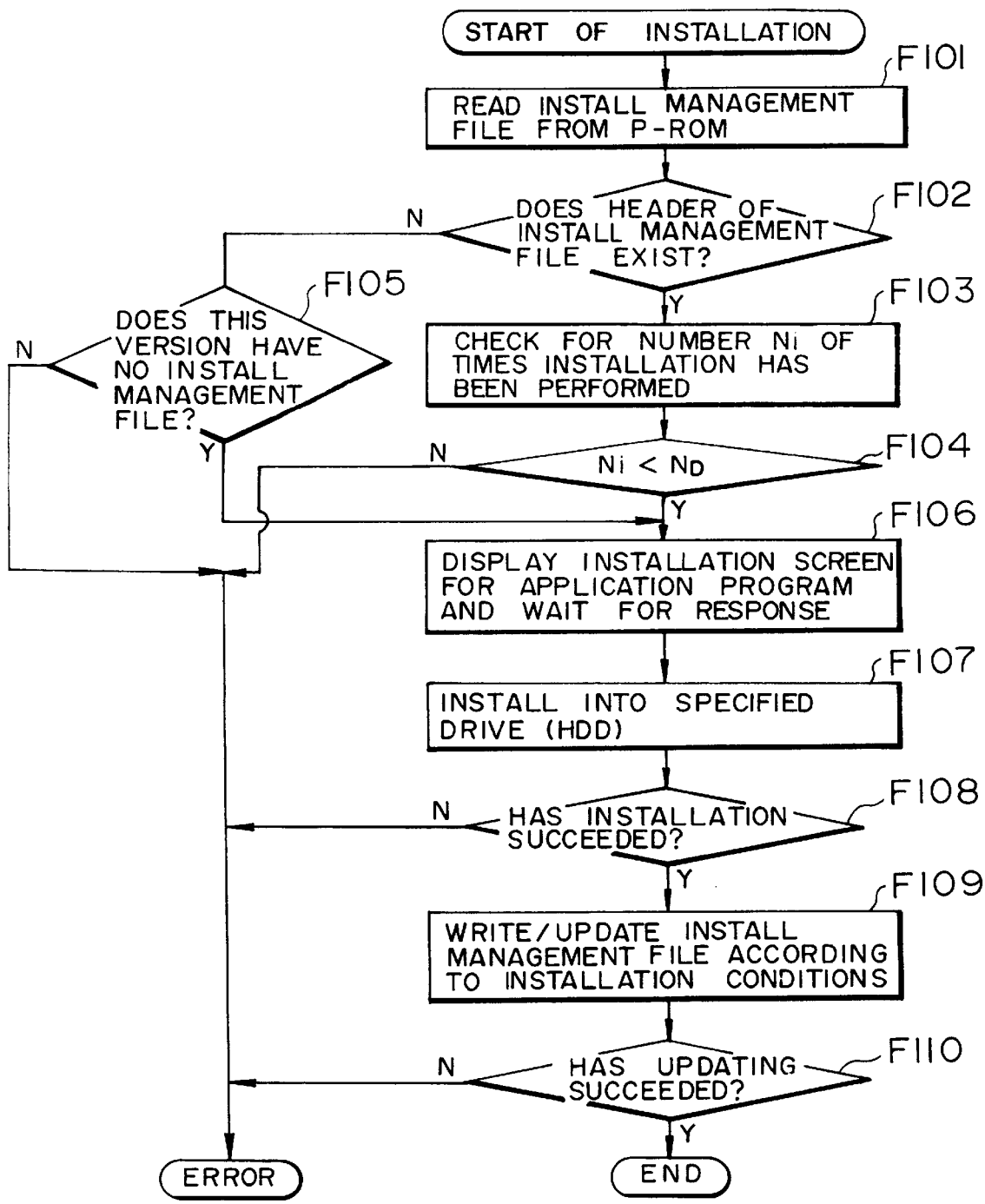
FIG. 16 is a flowchart of installation from the partial ROM disk according to the embodiment.

In the present embodiment, with an install program in the install system (install system read from the disk 90 to the host computer 2) serving as an application program 2e in FIG. 12, the processing shown in FIG. 16 is performed in installation.

The user loads the disk 90 into the recording and reproduction apparatus 1 and operates the host computer 2 to start the install system.

The host computer 2 displays on a monitor a request for selection of a program to be started. When the user selects the install processing program in response to this request, the host computer starts the processing shown in FIG. 16 according to the install system (application program 2e) based on the OS 2a.

When the install processing is selected in order to install an application program AP stored in the disk 90, the install management file recorded in the disk 90 is read in step F101.

In step F102, whether the install management file has already been recorded in the rewritable area ARW is checked.

The install management file includes past-installation history information, such as the number of times installation has been performed, and is disposed in the rewritable area ARW of the disk 90.

FIG. 15 shows a configuration of the install management file.

The install management file is formed in one or multiple sectors and has the header at the top 24 bytes with the code of "INSTALL_MANAGEMENT_SECT0."

The number Ni of times installation has been performed is recorded in the next four byte area.

The four byte area next to the area for the number Ni of times installation has been performed is reserved. The number Np of permitted installations may be recorded in this four byte area as indicated by parentheses.

The number Np of permitted installations is a constant used in the processing shown in FIG. 16 as described later. This number Np may be held by the install system in its program as a fixed value. Alternatively, the number Np may be recorded in the install management file shown in FIG. 15 (in this case, a variable). Depending on the system design policy, either or both ways can be selected.

Succeeding the four-byte reserved area (or the number Np of permitted installations), information of 128 bytes each for past installations is recorded.

The date (year, month, and day) when an installation was performed is recorded at an eight-byte area, and the identification information of a drive which drives an installation-destination recording medium is recorded in an 32-byte area as a destination-drive verification information (inquiry). In addition, the name of an installation-destination directory is recorded in a 64-byte area and the remaining 24 byte area is reserved.

The foregoing 128 bytes are used to record information of the first installation. The first sector is configured, for example, such that information of the first installation to that of the 15th installation can be recorded.

At the next sector, the code of "INSTALL_MANAGEMENT SECT1" is recorded as the header and the succeeding eight bytes are reserved.

In the same way as in the preceding sector, information of 128 bytes each for past installations can be recorded in the order of information of the 16th installation, that of the 17th installation, that of the 18th installation, and so on.

With the specified number of such sectors allocated, the install management file is completed.

In the 128-byte information area of each installation, 24 bytes are reserved. An ID number may be stored in this area and will be used in uninstallation described below.

It is necessary to form the install management file when an installation is first performed for the disk 90. Therefore, when the first installation is to be done for the disk 90, the install management file does not exist. This means that the header of the install management file is not detected (does not exist) in step F102 in FIG. 16.

If the disk is determined in step F105 to have a version in which no install management file exists at the first installation, the processing proceeds to step F106 in order to continue installation.

The install management file having initialized data may be formed in logical formatting described above and recorded in the rewritable area ARW. In this case, the install management file exists even when an installation is first performed for the disk 90. When this way of forming the install management file is employed, an affirmative result is obtained in step F102 even in the first installation.

If a negative result is obtained in step F102, that is, the install management file does not exist, when a disk having this kind of version is used, it is an erroneous condition. In this case, an affirmative result is not obtained also in step F105, and error handling is performed.

Let it be assumed that installation of an application program AP is allowed up to three times to recording media such as the hard disk 4 in the install system stored in the disk 90 in this embodiment. The install system has the number Np of permitted installations which equals 3 in its program. The number Np of permitted installations needs to be prevented from being rewritten by the user. By setting the number Np of permitted installations to a fixed value on the program in the install system, illegal changes by the user are prevented and security is increased.

As described with parentheses in FIG. 15, when the number Np of permitted installations is held in the install management file as rewritable information, security decreases but flexibility is provided by which the manufacturer can set the number Np of permitted installations.

When it is determined in step F102 in FIG. 16 that the install management file does not exist, as described above, there is no problem in performing installation (first installation) if a version is used in which the install management file is created at the first installation. Without checking the number Ni of times installation has been performed, the processing for installing an application program AP to the hard disk 4 is started in step F106.

On the other hand, when it is determined in step F102 that the install management file exists, the install management file is read in step F103. The install system (2e) controls the recording and reproduction apparatus 1 so that the apparatus reads the install management file from the disk 90 and obtains it through the interface 2c and the device driver 2b.

And then, as shown in FIG. 15, the number Ni of times installation has been performed, which is recorded in the install management file, is checked.

In step F104, the number Ni of times installation has been performed and the number Np of permitted installations are compared. When the number Ni is less than the number Np, the processing for installing an application program AP to the hard disk 4 is started in step F106.

When the number Np of permitted installations is 3, for example, the processing proceeds to step F106 only when the number Ni of times installation has been performed is 0, 1, or 2.

In step F106, the host computer 2 displays a screen for installation on the monitor and waits for a response. In other words, the host computer 2 asks the user to select an installation-destination medium. When the user inputs an installation destination such as the hard disk 4, installation is performed in step F107.

In step F107, the host computer 2, which operates based on the install system (2e), directs the recording and reproduction apparatus 1 to reproduce an application program AP from the disk 90, and receives the application program AP. The host computer 2 sends the program to the hard disk drive 3 and records it into the hard disk 4.

In installation, the host computer 2 directs the hard disk drive 3 to write verification information used in uninstallation, which is part of information concerning this-time installation and will be described later, into the hard disk 4. The information to be written into the hard disk 4 will be described later.

When installation is finished in step F107, whether the installation has been succeeded is checked in step F108. If the installation is not correctly performed, the processing is terminated as an error.

Successful installation means that, as shown in FIG. 14, an application program recorded in the disk 90 has been installed into the hard disk 4 and a file system FShd which controls the installed application program AP has been formed in the hard disk 4.

When installation has succeeded, the install system (2e) writes or updates the install management file on the disk 90 in step F109.

The number Ni of times installation has been performed is recorded in the install management file as described above. When the first installation is performed, for example, the install management file is formed with the number Ni of times installation has been performed set to 1 and is written into the rewritable area ARW of the disk 90 as shown in FIG. 14. When the number Ni of times installation has been performed is 1, which is checked in step F103, the number Ni is incremented to 2 and the install management file stored in the rewritable area ARW is updated.

In the present embodiment, the install management file includes data indicating an installation destination in each installation. This information is used for verification in uninstallation, which will be described later.

Installation-destination data (verification information) includes an installation date, destination-drive verification information, and a destination-directory name, for example, as described by referring to FIG. 15. Other verification information items may be used.

As the drive verification information for identifying the installation-destination drive, which is one item of verification information in the present embodiment, the ID number assigned to the destination drive (the hard disk drive 3 or the hard disk 4 in this case) can be used when it is unique. When an ID number is not used, a method can be used in which an ID number is generated and written into the install management file and the destination recording medium.

When the drive verification information such as the unique ID number is recorded in the install management file in the installation-destination recording medium, by checking the drive verification information for an application program AP installed into a recording medium, whether the program has been installed from the disk 90 can be checked.

The date when installation is performed is included in data for the installed application program AP, for example. In other words, the hard disk 4 records the installation date in the data for the application program AP.

In step F109, the installation date is recorded in the install management file on the disk 90.

With these operations, it can be determined from the disk 90 whether an application program AP installed into a recording medium has been installed from the disk 90 or from another disk of the same type (in which the same application program AP is recorded).

The date information may includes the date (year, month, and day) and the time (hour, minute, and second). Alternatively, the date information includes the time (hour, minute, and second) instead of date (year, month, and day).

By recording the installation-destination directory name in the specified area shown in FIG. 15, whether an application program AP installed into a recording medium has been installed from the disk 90 can be determined. It is because, when the installation source correctly corresponds to the installation destination, the directory must exist in the installation-destination recording medium To implement a verification function with the use of these verification information items, it is necessary to write required information also into the installation-destination hard disk 4. This information writing processing is performed in step F106 together with installation by the hard disk drive 3.

Information for verification written into the hard disk 4 at installation (hereinafter called verification information at installation) is written, for example, in forms shown in FIGS. 17A and 17B or FIGS. 18A and 18B.

Figure 17A:
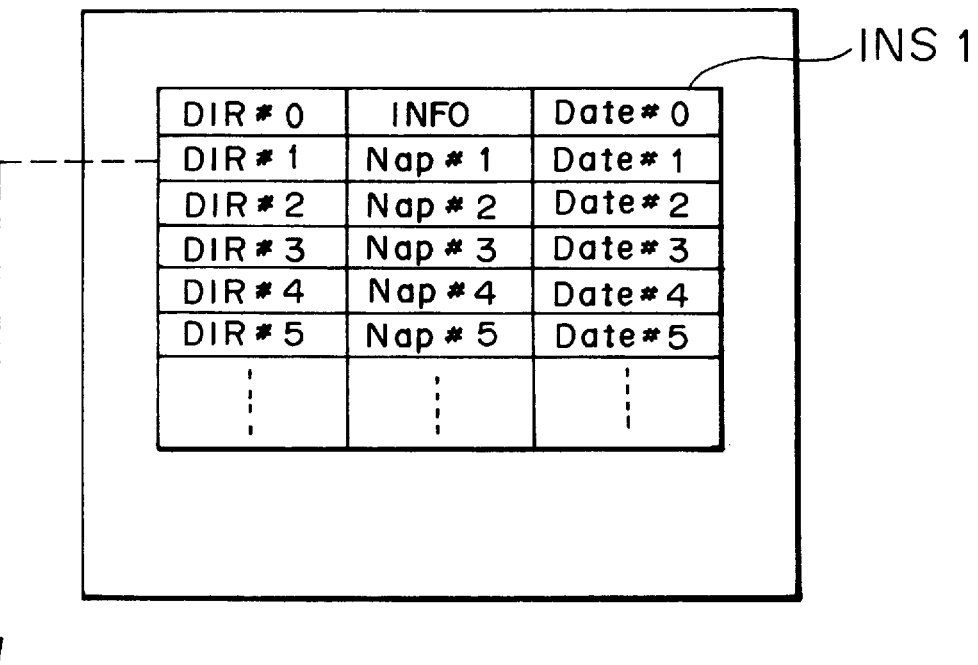
FIGS. 17A and 17B show verification information recorded into a hard disk at installation according to the embodiment.
Figure 17B:
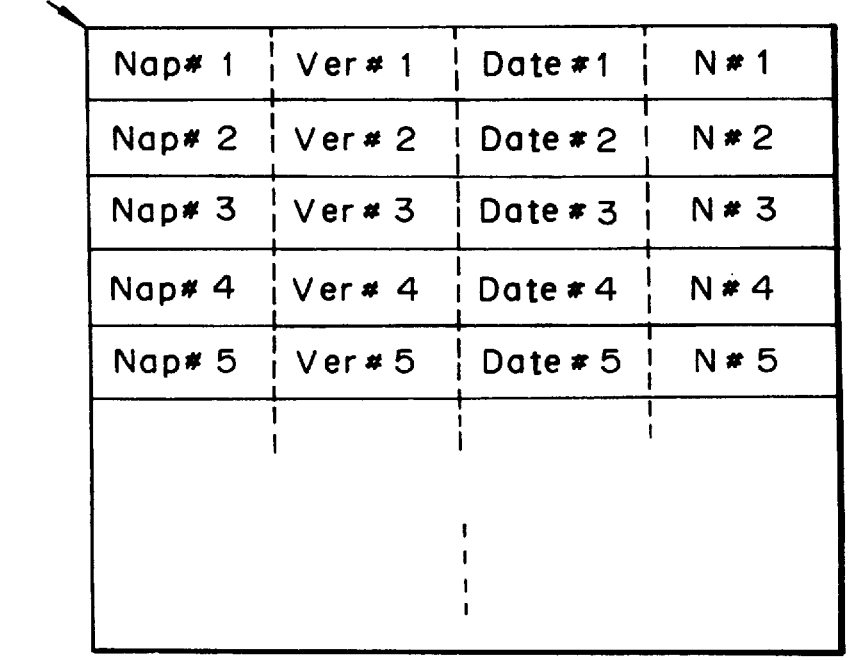

In FIGS. 17A and 17B, the verification information at installation is held in a data group INS1 of the file system FShd in the hard disk 4 and an information file INFO.

FIG. 17A shows a data part of the verification information at installation in the file system FShd. As a matter of course, the file system FShd includes data such as management data for files recorded in the hard disk 4. In FIGS. 17A, 17B, 18A, and 18B, such usual data is not shown.

In FIG. 17A, as the data group INS1 in the file system FShd, the directory of information file, DIR#0, the file name, INFO, and the date information, Date#0, are recorded. These items are recorded when the information file is formed, for example, when the first installation is performed. The date information Date#0 is either the date when the information file was formed or the date when the most recent updating was performed.

Every time when installation is performed, in the processing shown in step F106, the directories (DIR#1, DIR#2, . . . ), the application program names (Nap#1, Nap#2, . . . ), and the installation date (Date#1, Date#2, . . . ) corresponding to the installed application programs are recorded.

The recording position of the information file is controlled in the usual file management form as the file system FShd. The information file is formed in a user area in the hard disk 4. As shown in FIG. 17B, recorded in the information file INFO are the names of the installed application programs (Nap#1, Nap#2, . . . ), their version information (Ver#1, Ver#2, . . . ), the dates when installations were performed (Date#1, Date#2, . . . ) and how many times (N#1, N#2, . . . ) installation has been performed including the now-conducting installation (the number Ni of times installation has been performed plus 1).

Every time when installation is performed, in the processing shown in step F106, these items are added to the information file as information for the installed application programs.

In the method shown in FIGS. 17A and 17B, the information which the file system FShd inherently has is used and the other information required is stored in the information file INFO. In other words, the installed application program files are controlled by the file system FShd, and the directories, the application program names, and the dates of installation are recorded in the file system FShd. Therefore, these items are used as the verification information at installation. In addition, the information file INFO is provided to hold the version information and the number information as part of the verification information at installation.

Figures 18A, 18B:
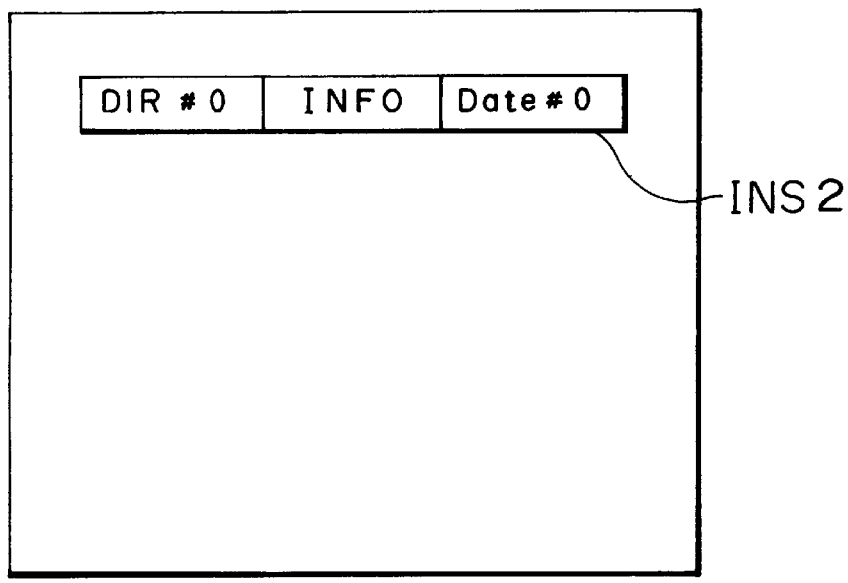
FIGS. 18A and 18B show verification information recorded into a hard disk at installation according to the embodiment.

In the method shown in FIGS. 18A and 18B, the verification information at installation is collectively held in the information file INFO.

As shown in FIG. 18A, the file system FShd controls the information file INFO in the same way as for other files as a file.

The verification information at installation for each actually installed application program is all held in the information file as shown in FIG. 18B.

Every time when installation is performed, in the processing shown in step F106, the verification information at installation for the installed application programs, namely their names (Nap#), the version information (Ver#), the dates when installation was performed (Date#), the number information (N#), and the directories (DIR#), are recorded in the information file INFO.

In step F106 in the processing shown in FIG. 16, the verification information at installation is written into the hard disk 4 in the form shown, for example, in FIGS. 17A and 17B, or FIGS. 18A and 18B.

Since the verification information at installation is also recorded in the hard disk 4, verification can be performed with the use of verification information in the install management file of the disk 90 as described above. In other words, whether an application program in the hard disk 4 has been installed from the disk 90 can be verified.

Since the disk 90 has the rewritable area ARW, an ID number can be assigned to each disk even if there are many disks of the same type. In other words, a unique ID number is assigned to each disk and is written into the rewritable area ARW.

In such a case, a disk ID number is written at installation as a data item in an application program AP to be installed. In other words, the hard disk 4 records the disk ID number as a data item in the application program AP.

Because the disk 90 already has the disk ID number, there is no need to record the disk ID number in the install management file in the processing shown in step F109. By checking the disk ID number of an application program AP installed into a recording medium, it can be determined from the disk 90 whether the program has been installed from the disk 90 or from another disk of the same type.

Various methods can be considered for verification of the installation destination from the disk 90. Data required based on each method needs to be recorded in the install management file.

After required information items are written into or updated in the install management file, it is checked in step F110 in FIG. 16 whether the install management file has been updated successfully. When updated successfully, a series of installation is finished. If updated unsuccessfully, the installation is terminated with an error.

Let it be assumed that after an application program AP has already been installed three times to recording media, the processing shown in FIG. 16 starts with an installation request.

The processing proceeds from step F102 to step F103 and the number Ni of times installation has been performed is checked in the install management file. In this condition, the number Ni is three and reaches the number Np of permitted installations (=3). Therefore, a negative result is obtained in step F104 and the processing is terminated with an error without performing installation.

In the present embodiment, when the number Np of permitted installations is set to three, for example, an application program AP can be installed into recording media at most three times. An application program is prevented from being illegally installed without limit and used. Therefore, the legally correct user, who bought the disk 90 properly, can install and use the application program. On the other hand, the user who has lent the disk 90 or stolen it is prevented from illegally using the application program by installing it to his or her own personal computer.

In the present embodiment, the number Np of permitted installations is set to three. It is just an example. The number Np may be set to one in order to strictly inhibit illegal use. The Number Np may also be set to two or more than four such that the user can install an application program to a new hard disk if the application program AP cannot be used due to a crash of the hard disk to which the program has been installed.

As described before, when the number Np of permitted installations is recorded in the install management file, the number Np can be set flexibly to some extent.

To store a plurality of application programs in a disk, it is necessary to control the history (such as the number of installations and the time of installation) of past installation for each application program in the install management file.

In steps F102 and F109 in FIG. 16, the install system 2e accesses the install management file on the disk 90 for required read and write operations. To prevent illegal changes in items such as the number Ni of times installation has been performed, it is preferred that the install management file be accessed in a condition in which the access is invisible to the user (the user cannot change the items).

One method to implement this preference is that the install system (2e) directly orders the device driver 2b to read and write from and into the install management file without using the file system 2d (FS2).

To this end, a certain address is specified within the rewritable area ARW of the disk 90 to set an install management file area. As shown by a dotted line in FIG. 12, the host computer 2 is set such that the install system (2e) directly sends a logical address, the length of data, and a command to the device driver 2b to perform read/write operations in the install management file area.

In this case, the install management file area is controlled such that the file system FS2 regards the area as an unused area. The file system FS2 may regard the area as a defective area.

In other words, the install management file area is set such that the area is invisible to the file system FS2, namely, to the user, and the area is controlled by the install system 2e only. With this configuration, the user cannot see the install management file and therefore cannot change it illegally.

In another method, the file system FS2 controls the install management file. In this case, the contents of the file is encrypted.

In other words, the install system (2e) has encryption and decryption functions and sends data for update after encrypted when the install system writes or updates the install management file (namely, sends data for update) through the file system FS2 (2d).

When the file system reads the install management file through the file system FS2 (2d) (namely, receives read data), since the data has been encrypted, the data is decrypted to analyze its contents.

By encrypting the file contents in this way, the user cannot check the contents (although can detect the existence of the install management file) even when the user uses the file system FS2 to perform read/write operations, and illegal changes are prevented.

When the install management file is used under the management of the file system FS2, it is preferred that the install management file be set to a read-only file for the file system FS2 in addition to being encrypted, so that the user cannot change its contents. It is also effective to employ the above-described encryption in a method in which the install system (2e) directly accesses the install management file without using the file system (2d). When encrypted, even if data is analyzed at the interface, for example, it cannot be decrypted and illegal use is strongly prevented.

In the present embodiment, logical formatting generates the file system FS2, and the rewritable area in the disk 90 is made ready to use. In installing an application program AP, only an application management file is used in the rewritable area ARW.

Therefore, when the file system FS1 controls in advance such that the install management file exists in the rewritable area ARW and the install management file is updated according to installation as described above, the disk can be used before logical formatting.

5. Uninstallation

Uninstallation will be described below in which an application program installed into the hard disk 4 as described above is deleted.

When a case is taken into account in which an application program installed into the hard disk 4 is deleted for some reason, it may be inconvenient in some cases that the number of permitted installations is limited as described above.

When the legally correct user, who bought the disk 90 properly, installed the application program into the hard disk 4 and has used it, and then the user discards the hard disk 4 and buys a new hard disk system, if the number Np of permitted installations for the application program from the disk 90 reaches the limit, even the legally correct user cannot install the application program recorded in the disk 90 to the new hard disk system.

Figure 20:
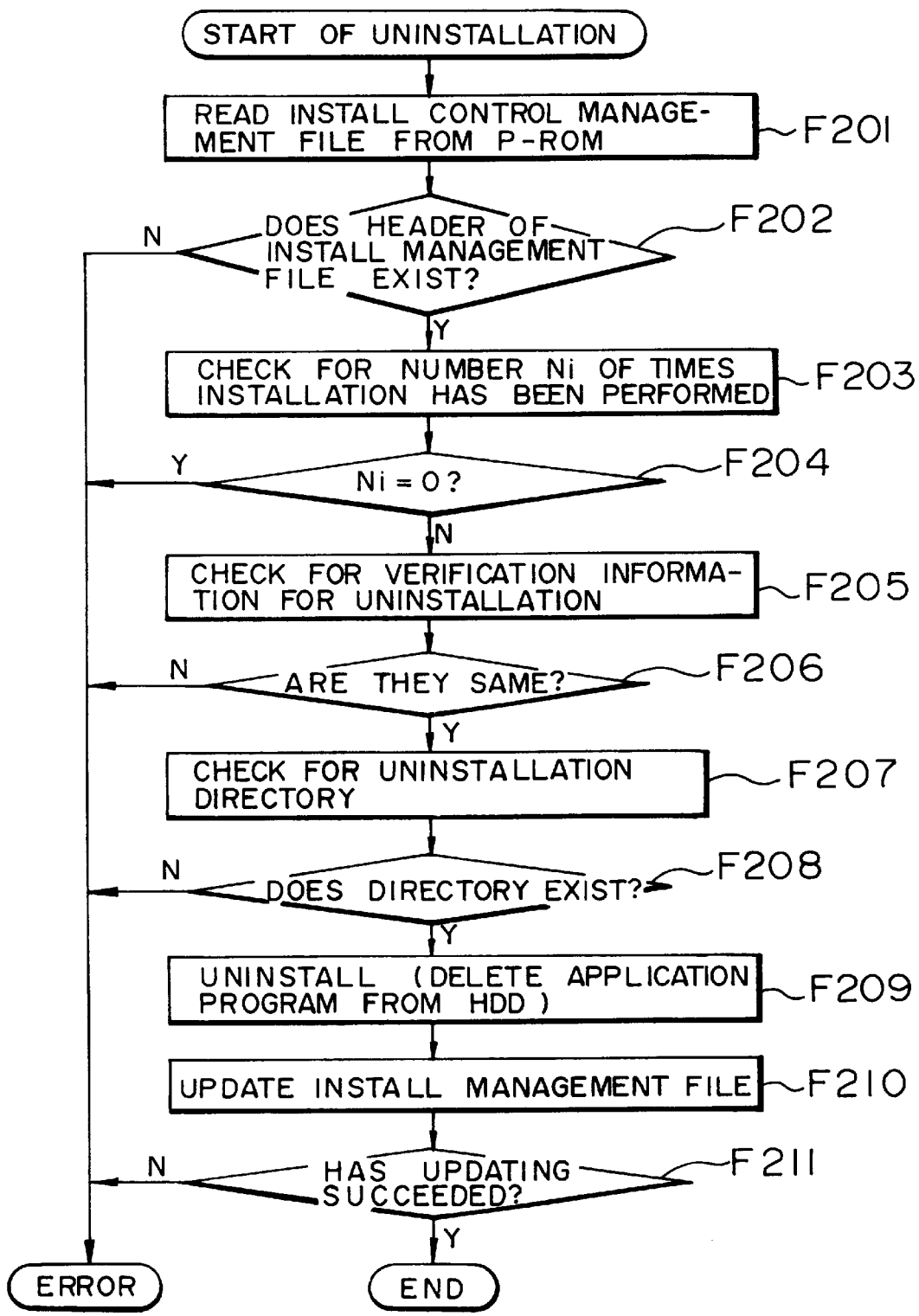
FIG. 20 is a flowchart of uninstallation from a recording medium other than the partial ROM disk according to the embodiment.

To solve this problem, uninstallation shown in FIG. 20 is provided in the present embodiment which is performed before the hard disk drive 3 is discarded.

When an application program installed into an installation-destination recording medium such as the hard disk 4 becomes unnecessary, the user loads the disk 90 into the recording and reproduction apparatus 1 and directs the host computer 2 to uninstall the application program AP.

More specifically, the user loads the disk 90 into the recording and reproduction apparatus 1 and starts the install system from the host computer 2. The install system (2e) is read and started. The host computer 2 displays a request for the selection of a starting program on a monitor (not shown). When the user selects the start of an uninstall processing program in response to the request, the install system (2e) based on OS 2a starts the processing shown in FIG. 20.

In step F201, the install management file recorded in the specified area of the disk 90 is read.

The header of the install management file is checked for in step F202. In other words, whether the install management file exists is checked. If the disk 90 has been used for installation, the install management file must be formed. Therefore, if the header is not detected in step F202, the disk 90 has not yet been used for installation or the disk is erroneous. In either case, the disk is not proper as the installation source of an application program to be uninstalled. Uninstallation is not performed and the processing is terminated with an error.

When the install management file is detected in step F202, the number Ni of times installation has been performed which is recorded in the file is checked for.

If it is determined in step F204 that the number Ni of times installation has been performed equals 0, the disk 90 has not yet used for installation or the disk has been used for installations but also used for uninstallations the same number of times. In either case, the disk is not proper as the installation source of an application program to be uninstalled. Therefore, uninstallation is not performed and the processing is terminated with an error also in this case.

When the number Ni of times installation has been performed is not 0 and the processing proceeds to step F205, the verification information of a recording medium (such as the hard disk drive 3) where uninstallation is to be performed is checked for.

In the present embodiment, the date information, the drive verification information, and the directory are recorded as verification information as described before, all or part of these items will be checked in the subsequent process.

In step F205, whether the verification information matches is checked. In other words, the drive verification information recorded in the install management file is verified with the information (such as the unit ID number) of the drive where uninstallation is to be performed. In step F206, whether they are identical is checked. Also in this process, whether the application program AP to be requested to be uninstalled has been installed from the disk 90 is determined. If they are not identical, the processing is terminated with an error.

As a matching check, the date information may be used. The date information recorded in the install management file is compared with the installation date information (Date#) recorded for an application program to be uninstalled in the verification information at installation recorded in the hard disk 4 in the form shown in FIGS. 17A and 17B or FIGS. 18A and 18B to check whether they are identical. If they are different, it is determined that the application program requested to be uninstalled this time has not been installed from the disk 90, and the processing is terminated with an error.

When it is checked that the drive is identical due to the drive verification information and the date information, the uninstallation directory is checked in step F207 as a verification-information check. If a directory having the same name as that of the directory to which installation has been performed which is recorded in the install management file does not exist in a medium for which uninstallation is to be performed, the processing is terminated with an error in step F208. When such a directory exists, the processing proceeds to step F209.

When the processing proceeds to step F209, it has been checked that the application program AP to be uninstalled has been installed from the disk 90 which is currently loaded. The application program AP is uninstalled from the hard disk 4.

Figure 19:
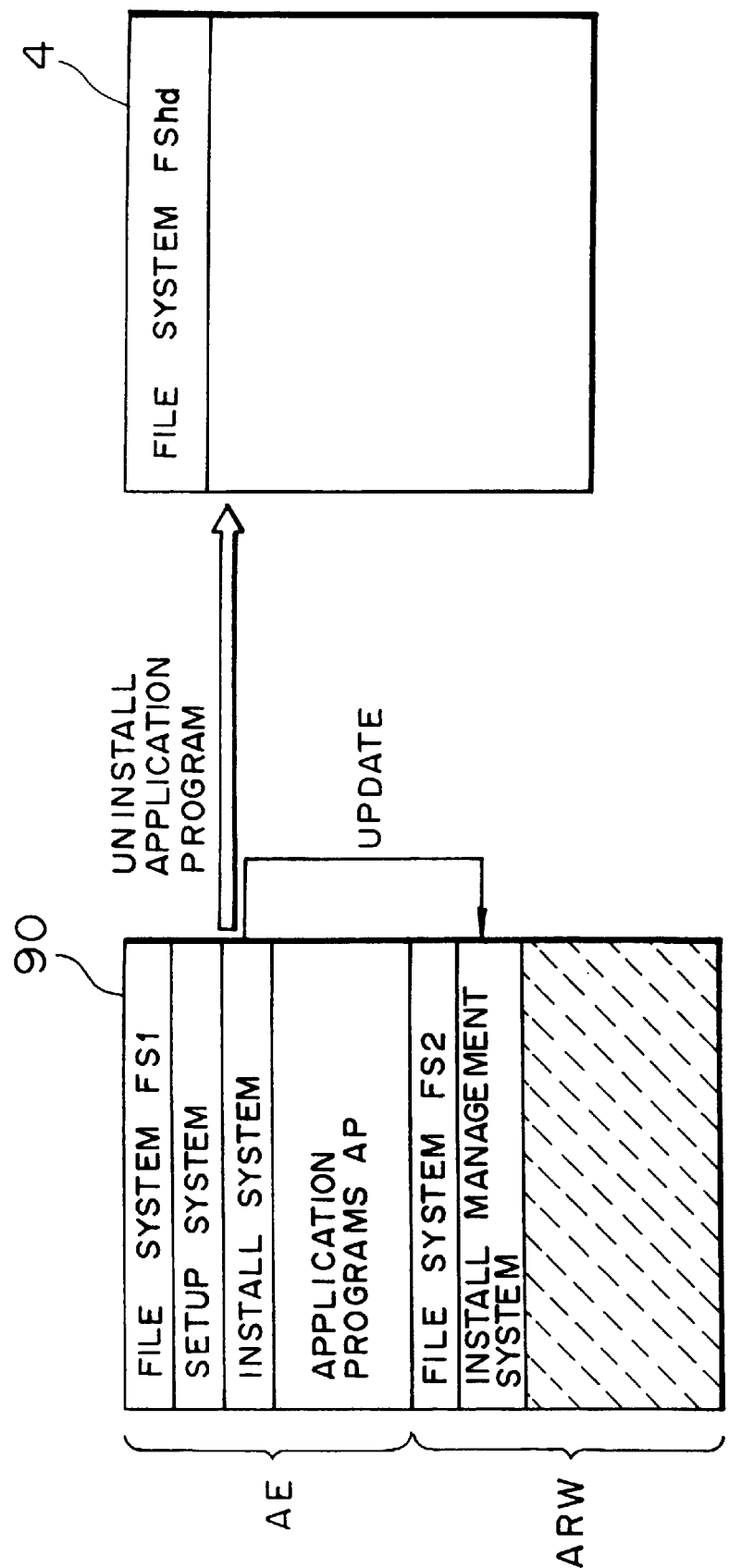
FIG. 19 illustrates uninstallation from the hard disk according to the embodiment.

The host computer 2, which operates according to the install system (2e), directs the hard disk drive 3 to delete the application program AP from the hard disk 4 to make the hard disk 4 to the state shown in FIG. 19.

As shown in FIG. 19, in step F210, the install system (2*e*) updates the install management file in the rewritable area ARW of the disk 90 according to the unistallation in step F209.

Updating in this case means that the number Ni of times installation has been performed is decremented for the uninstalled application program AP. When the number Ni is three before the uninstallation, for example, the number Ni is updated to two at the uninstallation.

With this updating, a series of uninstallation is completed.

When the processing is terminated with an error, it has been determined that the application program AP requested to be uninstalled has not been installed from the disk 90 even if it is the same application program. Therefore, neither uninstallation nor updating the install management file is performed.

As described above, by decrementing the number Ni of times installation has been performed, at every uninstallation, even if the number Ni once reaches the limit in the past installation history, the application program can be installed into a recording medium after uninstallation is performed. Therefore, the legally correct user, who has bought the disk 90 properly, can use the application program AP in any cases.

If the installation-source disk does not correspond to the installation-destination recording medium, neither uninstallation nor decrementing the number Ni of times installation has been performed is performed. When an attempt is made by the user to illegally uninstall the application program AP from a hard disk of another person with the use of the user's disk 90, it cannot be completed. It is also impossible to install the application program AP beyond the number Np of permitted installations by illegally decrementing the number Ni of times installation has been performed.

When the host computer is used as a server in a network, installation/uninstallation management is made possible by writing the number of terminals using the firm into the rewritable area ARW in the install management file.

In uninstallation, the install management file is read/written in steps F201 and F210. In the same way as in the above-described installation, in accessing the install management file, the install system (2*e*) directly accesses without using the file system FS2 (2*d*) or the contents of data is encrypted.

In the above-described installation, an ID number may be recorded in a 24-byte reserved area located in the installation data area in the install management file shown in FIG. 15. With this ID number, a system in which illegal uninstallation is inhibited can be made by requesting the user to enter the ID number at uninstallation and causing an error if the ID number does not match the recorded number.

6. Various disks In the above embodiment, a partial ROM disk in which data files are recorded as shown in FIG. 13 is used as the disk 90. Various types of data contents can be considered for the partial ROM disk. Four types will be described below by referring to FIGS. 21 to 24.

Figure 21:
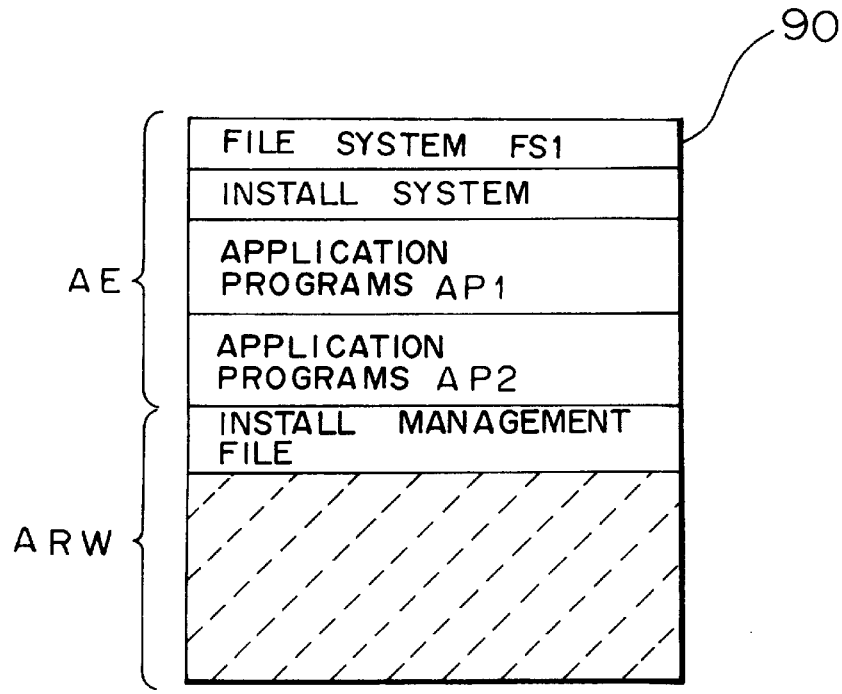
FIG. 21 is a view of the contents of a partial ROM disk according to another embodiment.

In a disk 90 shown in FIG. 21, a file system FS1, an install system, and application programs AP1 and AP2 are recorded in the ROM area AE, and an area for recording an install management file is specified at the top of the rewritable area ARW.

The disk 90 of this type is suited to an installer disk. The file system FS1 controls the install system and the application programs AP1 and AP2. In system operations shown in FIG. 12, the install system is read according to the file system 2*d* (FS1) and started. The started install system 2*e* performs the installation described above to install the application programs AP1 and AP2.

The file system FS1 does not control the rewritable area ARW. Therefore, the install system (2*e*) directly generates and updates the install management file without using the file system FS1. The data contents of the install management file may be encrypted.

In the disk 90 shown in FIG. 21, the rewritable area ARW contains the install management file only.

Figure 22:
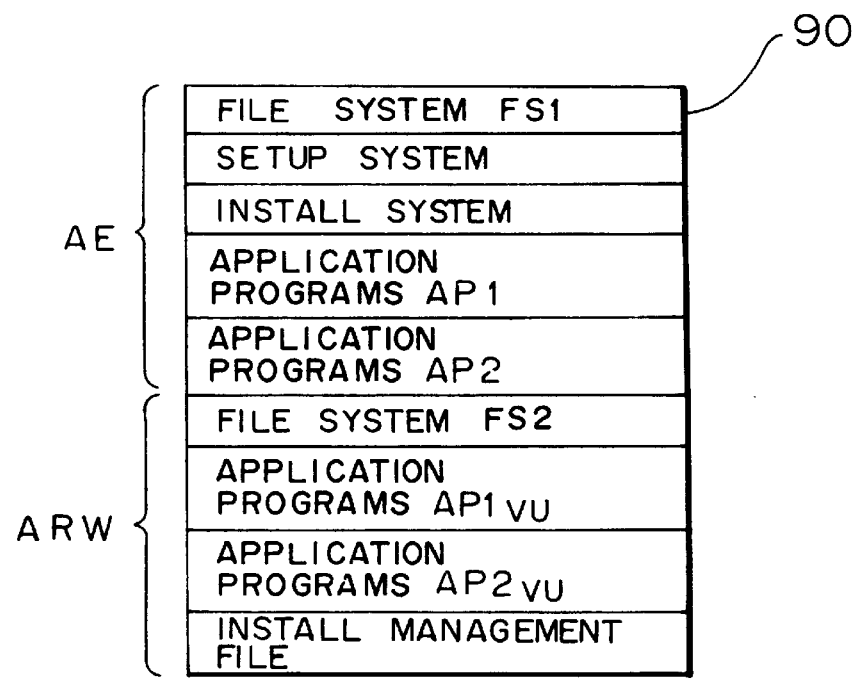
FIG. 22 is a view of the contents of a partial ROM disk according to still another embodiment.

By changing the configuration of the disk to that shown in FIG. 22, the disk can also be used for the upgrade of application programs easily.

In the disk shown in FIG. 22, the ROM area AE records the file system FS1, the install system, and the application programs AP1 and AP2 in the same way as in the disk shown in FIG. 21.

In the rewritable area ARW, a file system FS2 is formed at the top in order to allow the files in the rewritable area ARW and the ROM area AE to be controlled. Upgraded files AP1VU and AP1VU which are upgraded versions of the application programs AP1 and AP2 are also recorded. Once the file system FS2 is formed by logical formatting, the file system FS1 in the ROM area is not used any longer.

Since the file system FS2 uses the top area of the rewritable area ARW, the install management file is recorded, for example, at the end of the rewritable area ARW.

This disk 90 is made from a disk formed for offering application programs as shown in FIG. 21 by effectively using the rewritable area ATW to handle upgraded application programs. The disk shown in FIG. 21 can be mass-produced by stamping with application programs being formed in ROM. If such a disk remains and the application programs AP1 and AP2 are upgraded, the rewritable area ARW is used as shown in FIG. 22 to add the upgraded application programs AP1VU and AP1VU.

In other words, the file system FS2 is formed, which controls both ROM area AE and rewritable area ARW. Since the application programs AP1 and AP2, and their upgraded versions, the programs AP1VU and AP2VU, are recorded, the file system FS2 can install the application program AP1 together with the upgraded application program AP1VU.

In FIG. 22, the setup system is recorded in the ROM area. The setup system is used as a logical-formatting tool for building the file system FS2. Since the disk supplier (software manufacturer) performs logical formatting and writes the upgraded programs AP1VU and AP2VU, the setup system is not necessarily needed. The ROM area AE may be the same as that shown in FIG. 21.

The file system FS2 controls the install management file. The data contents of the install management file may be encrypted by the install system as described above. Alternatively, the install system may directly access the install management file without any management from the file system FS2.

In the disk shown in FIG. 21, the install system may specify an area for the install management file at the end of the rewritable area ARW if the future expansion of the disk as shown in FIG. 22 is taken into account.

Figure 23:
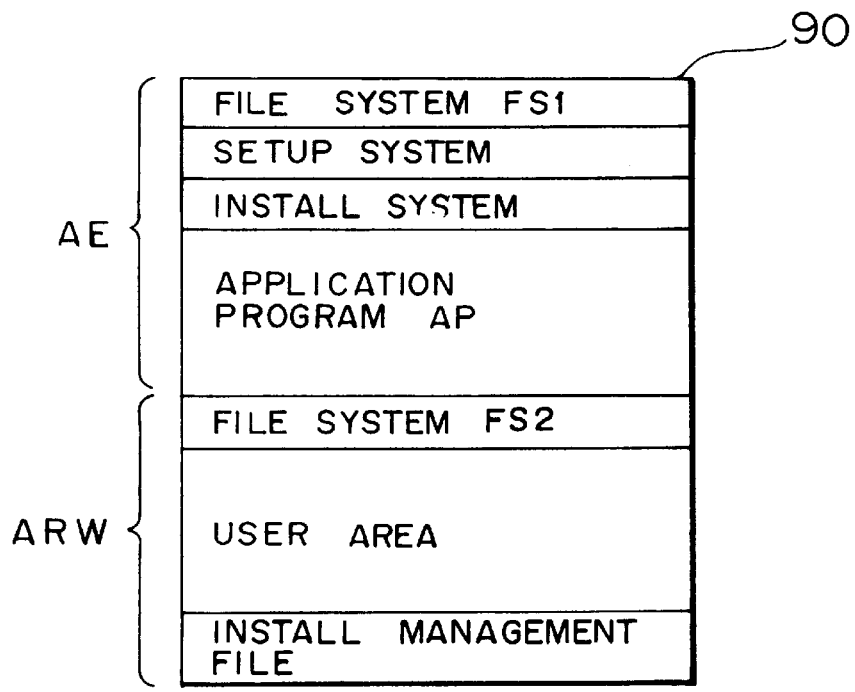
FIG. 23 is a view of the contents of a partial ROM disk according to yet another embodiment.

FIG. 23 shows a configuration of a disk 90 which can be used as an installer disk and can save data with an application program being run by the disk.

In this case, the ROM area AE stores a file system FS1, a setup system, an install system, and an application program AP.

In the rewritable area ARW, the setup system performs logical formatting to form a file system FS2 at the top. File management is made available in the rewritable area ARW and the ROM area AE. In this case, the rewritable area ARW is used as a user area. An area for the install management file is specified at the end of the rewritable area ARW. The install management file is encrypted and controlled by the file system FS2 in the same way as shown in FIG. 22. Alternatively, the install system directly accesses the install management file.

In the disk 90 shown in FIG. 23, since the file system FS2 can control the install system, the application program, and the user area, the file system FS2 installs the application program into the hard disk 4 and uninstalls the program from the hard disk 4 as described above.

Without installation, the application program AP can be executed by loading it to the host computer 2 and starting it. Various types of data generated by the application program can be saved to the user area.

The disk 90 can be used as a medium for offering an application program without installation.

Figure 24:
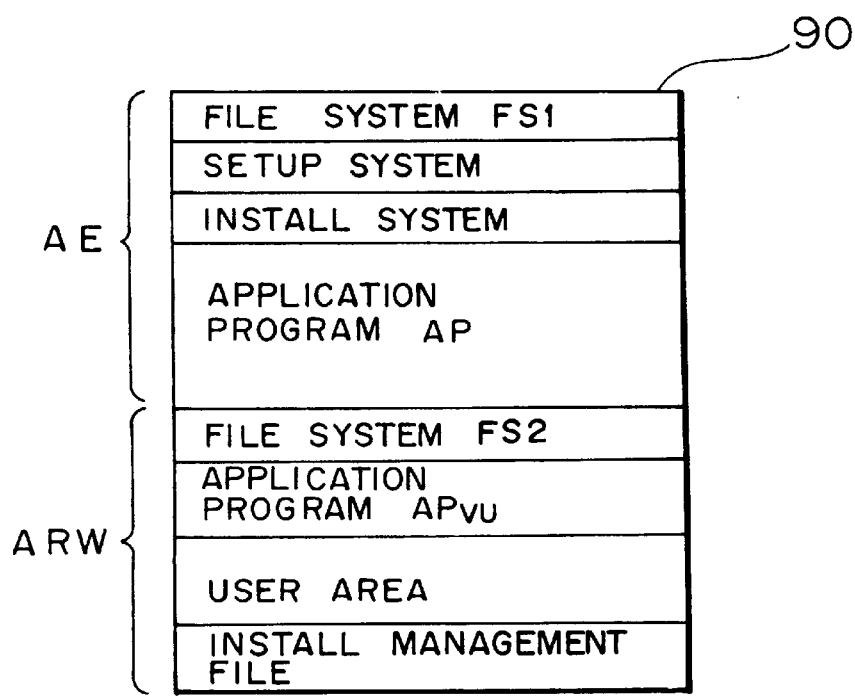
FIG. 24 is a view of the contents of a partial ROM disk according to a further embodiment.

FIG. 24 shows a disk which can handle an upgraded application program with the use of the rewritable area ARW in addition to the same functions as the disk shown in FIG. 23 has. The upgraded application program APVU is added in the rewritable area ARW. The same advantages as those obtained by the disk shown in FIG. 22 is obtained.

The partial ROM disk is used in the embodiment. The present invention can be applied to various types of recording media in which a recording and reproduction area is provided.

It is desirable that a disk, such as a partial ROM disk, which has a recording-impossible area such as a reproduction-only area made by embossed pits, be used and an application program be recorded in the reproduction-only area. Because, even if an operation error occurs during a write operation such as updating the install management file, the application program is neither deleted nor destroyed.

When the data of the install management file is encrypted, even if an attempt is made to illegally change the install management file with some means, that attempt can be prevented.

In the above embodiment, the recording and reproduction apparatus 1 serves as a drive unit having a switching function between the file system FS1 and the file system FS2 (address conversion function according to the formatting stage as described above). The present invention can also be applied to a system having a drive unit which can only be used with the file system FS1 and a system having a drive unit which can only be used with the file system FS2. The present invention can also be applied to a system in which a file system is independently created.

In the above embodiment, the partial ROM disk is used. A recording medium having at least a recording and reproduction area can be used for the present invention. A medium having both of a recording and reproduction area and a reproduction-only area can be more preferably used for the present invention.

As described above, since an install control means for recording installation information in a recording and reproduction area as install management data is recorded in a recording medium according to the present invention when an application program recorded in the recording medium is installed into another recording medium such as a hard disk, the recording medium itself can control the installation history and other information.

The install management data includes at least the number of times an application program has been installed into recording media. The install control means specifies in advance the number of permitted installations of the application program. When installation is requested, installation is permitted only when the number of times installation has been performed recorded in the install management data is less than the number of permitted installations. It prevents unlimited installations from being performed.

When the install control means holds the number of permitted installations as a fixed information, the number is not easily changed and the illegal-installation preventing function is enhanced.

When the install control means holds the number of permitted installations in the install management data as an updatable information, the medium vendor can specify the number flexibly to some extent to handle various situations.

When the install control means operates under the control of the file system information means, it can be operated in the same use condition as a usual software medium.

Since the install control means and the file system information means are recorded in a reproduction-only area, they are not deleted carelessly. They can also be used as ROM media for program files.

When an application program installed from the recording medium to another recording medium is uninstalled, the install control means updates the install management file such that the number of times installation has been performed recorded in it is decremented. Then, the legally correct user can use the application program any time within the proper scope of use. Neither illegal uninstallation nor illegal update of the number of times installation has been performed in the install management file can be done.

When an application program is installed into a recording medium, since the install control means records in a recording and reproduction area verification information such as that concerning the recording medium and its drive, the date when the installation is performed, and the directory as the install management data, it can be checked that the application program to be uninstalled, the drive, and the disk match those used in installation. Therefore, illegal uninstallation can be prevented.

The number of times installation has been performed is recorded in a recording and reproduction area of a recording medium at every installation. When a request for installing an application program to another recording medium is made, the number of times installation has been performed recorded in the source recording medium is checked and only when the number is less than the specified number, installation is performed. This installation management method on the recording medium prevents the application program to be offered illegally by unlimited installation.

When a request for uninstalling an application program is made, uninstallation is performed only when it is determined by referring to the number of times installation has been performed and/or verification information recorded in the source recording medium that the application program to be uninstalled from a recording medium has been installed from the source recording medium. With this method, proper management of uninstallation is implemented so that only the legally correct user is permitted to do proper uninstallation.

What is claimed is:

1. A recording medium, comprising:
   a recording and reproduction area; and
   an application program and an install control program recorded on said recording and reproduction area, wherein said install control program directs a first drive unit to record into said recording and reproduction area information concerning installation of said application program as install management information when said application program is installed in another recording medium, wherein said install control program directs said first drive unit to record in said recording and reproduction area performed-installation count information indicating the number of times said application program has been installed in another recording medium as said install management information, wherein said install control program compares said performed-installation count information recorded in said recording and reproduction area with permitted-installation count information indicating the predetermined number of permitted installations when said application program is requested to be installed in another recording medium, and does not allow said application program to be installed when said performed-installation count information is greater than said permitted-installation count information, and wherein said install control program controls a second drive unit which operates said another recording medium to uninstall said application program from said another recording medium and directs said first drive unit to decrement said performed-installation count information recorded in said recording and reproduction area, when said application program is requested to be uninstalled.

2. A recording medium comprising at least a recording and reproduction area, wherein an application program and an install control program are recorded, and said install control program directs a first drive unit to record information concerning installation into said recording and reproduction area as install management information when said application program is installed in another recording medium, wherein said install control program directs said first drive unit to record in said recording and reproduction area performed-installation count information indicating the number of times said application program has been installed in another recording medium as said install management information, wherein said install control program compares said performed-installation count information recorded in said recording and reproduction area with permitted-installation count information indicating the predetermined number of permitted installations when said application program is requested to be installed in another recording medium, and does not allow said application program to be installed when said performed-installation count information is greater than said permitted-installation count information, wherein said install control program controls a second drive unit which operates said another recording medium to uninstall said application program from said another recording medium and directs said first drive unit to decrement said performed-installation count information recorded in said recording and reproduction area, when said application program is requested to be uninstalled, wherein said install control program directs said first drive unit to record verification information for identifying said another recording medium in said recording and reproduction area as said install management information as said application program is installed, and said install control program references said verification information recorded in said recording and reproduction area when said application program is requested to be uninstalled and does not allow said application program to be uninstalled from the recording medium of said second drive unit irrespective of said permitted-installation count information when it is determined that the recording medium of said second drive unit is not an installation-destination of said application program.

3. A recording medium according to claim 2, wherein said verification information is time information.

4. A recording medium according to claim 2, wherein said verification information is the directory information of said application program in the recording medium of said second drive unit.

5. An installation management method for installing an application program recorded in a first recording medium to a second recording medium comprising the steps of:

receiving a request to install an application program onto a second recording medium;

starting an install control program from said first recording medium comprising at least a recording and reproduction area where the application program and the install control program are recorded, wherein said install control program directs a first drive unit to record information concerning installation into said recording and reproduction area as install management information when said application program is installed in another recording medium, wherein said information concerning installation includes a performed-installation count indicating a number of times installation of said application program has been performed;

comparing said install management information with permitted-installation count information indicating a predetermined number of permitted installations when said request is received that said application program is to be installed in said second recording medium; and disabling installation of said application program when said performed-installation count information is greater than said permitted-installation count information in said step for comparing and enabling installation of said application program when said performed-installation count information is less than said permitted-installation count information.

6. An installation management method according to claim 5, wherein a file system is recorded in said recording medium, and said install control program operates according to said file system.

7. An installation management method according to claim 6, wherein said recording medium has a reproduction-only area, and said file system and said install control program are recorded in said reproduction-only area.

8. An installation management method according to claim 5, further comprising the steps of:

controlling a second drive unit which operates said another recording medium according to said install control program to uninstall said application program from said another recording medium; and controlling said first drive unit to decrement said permitted-installation count information recorded in said recording and reproduction area, when said application program is requested to be uninstalled.

9. An installation management method for installing an application program recorded in a first recording medium to a second recording medium comprising the steps of:

starting an install control program from said first recording medium comprising at least a recording and reproduction area, wherein an application program and the install control program are recorded, and said install control program directs a first drive unit to record information concerning installation into said recording and reproduction area as install management information when said application program is installed in another recording medium;

comparing said install management information with permitted-installation count information indicating the predetermined number of permitted installations when it is specified that said application program is installed in said second recording medium;

controlling a second drive unit which operates said another recording medium according to said install control program to uninstall said application program from said another recording medium;

controlling said first drive unit to decrement said permitted-installation count information recorded in said recording and reproduction area, when said application program is requested to be uninstalled disabling installation of said application program when said performed-installation count information is greater than said permitted-installation count information in said step for comparing and enabling installation of said application program when said performed-installation count information is less than said permitted-installation count information;

controlling said first drive unit to record verification information for identifying said another recording medium in said recording and reproduction area as said install management information according to said install control program as said application program is installed; and checking said verification information recorded in said recording and reproduction area when said application program is requested to be uninstalled so that said application program is not uninstalled from the recording medium of said second drive unit irrespective of said permitted-installation count information when it is determined that the recording medium of said second drive unit is not an installation-destination of said application program, and said application program is uninstalled from the recording medium of said second drive unit when it is determined that the recording medium of said second drive unit is an installation-destination of said application program.

* * * * *